(12) United States Patent
Graziano et al.

(10) Patent No.: US 7,113,491 B2
(45) Date of Patent: Sep. 26, 2006

(54) METHOD AND SYSTEM FOR VARYING AN ECHO CANCELLER FILTER LENGTH BASED ON DATA RATE

(75) Inventors: Michael J. Graziano, Sunnyvale, CA (US); Sujai Chari, Redwood City, CA (US)

(73) Assignee: Conexant, Inc., Red Bank, NJ (US)

( * ) Notice: Subject to any disclaimer, the term of this patent is extended or adjusted under 35 U.S.C. 154(b) by 1016 days.

(21) Appl. No.: 10/050,128

(22) Filed: Jan. 18, 2002

(65) Prior Publication Data

US 2003/0099208 A1 May 29, 2003

Related U.S. Application Data

(60) Provisional application No. 60/308,587, filed on Jul. 31, 2001.

(51) Int. Cl.
*H04B 3/20* (2006.01)
(52) U.S. Cl. ........................ 370/286; 370/290
(58) Field of Classification Search ............... 370/286, 370/282, 201, 289, 290, 291, 386; 375/222, 375/221; 379/406.01–406.14
See application file for complete search history.

(56) References Cited

U.S. PATENT DOCUMENTS

| | | | |
|---|---|---|---|
| 5,363,321 A | | 11/1994 | Dao Trong et al. |
| 5,473,686 A | * | 12/1995 | Virdee ................... 379/406.08 |
| 5,524,089 A | | 6/1996 | Takano |
| 5,535,150 A | * | 7/1996 | Chiang ....................... 708/322 |
| 5,570,310 A | | 10/1996 | Smith |
| 5,600,581 A | | 2/1997 | Dworkin et al. |
| 5,604,691 A | | 2/1997 | Dworkin et al. |
| 5,642,305 A | | 6/1997 | Pan et al. |
| 5,703,801 A | | 12/1997 | Pan et al. |
| 5,909,384 A | * | 6/1999 | Tal et al. ..................... 708/322 |
| 5,940,312 A | | 8/1999 | Hansen |
| 5,941,939 A | | 8/1999 | Pan et al. |
| 6,061,427 A | * | 5/2000 | Ryoo ........................ 379/22.04 |

(Continued)

FOREIGN PATENT DOCUMENTS

WO  WO 01 43415 A  6/2000

OTHER PUBLICATIONS

Haykin, Simon, *Communication System* 4th Edition, Wiley, 2001, p. 436.

(Continued)

*Primary Examiner*—Andrew C. Lee
(74) *Attorney, Agent, or Firm*—Hunton & Williams LLP

(57) ABSTRACT

The present invention provides methods and systems for providing efficient use of available CPU cycles that may be achieved by reducing the length of the echo canceller filter. An echo canceller's adaptive algorithm may be implemented to reach a lower mean squared error due to the increased training time allowed by cycle reduction. Total power consumption of a processor may be reduced by reducing the number of multiplications (and/or other operations) that may be performed by an echo canceller filter for each time iteration. This may be achieved by not performing multiplications on taps that are not being used. For higher rates, a shorter echo canceller filter may be implemented by transmitting less energy in low frequencies. As a result, the temporal length of the echo channel may be shortened thereby reducing the total number of taps needed to model the channel. The present invention may further enhance performance by reducing CPU cycles and allowing for more echo canceller training time.

38 Claims, 34 Drawing Sheets

U.S. PATENT DOCUMENTS 6,965,578 B1 * 11/2005 Kappes ........................ 370/286

OTHER PUBLICATIONS

Brigham, E. Oran, *The Fast Fourier Transform and its Applications,* Prentice Hall, 1988, pp. 191-193.

Embree, Paul M. and Kimbel, Bruce, *C Language Algorithms for Digital Signal Processing,* Prentice Hall, 1991, pp. 255-256 and 266 and 267.

Haykin, Simon, *Adaptive Filter Theory* 3rd *Edition,* Prentice Hall, 1996, pp. 393-404.

Proakis, John G., Manolakis, Dimitris G., *Digital Signal Processing: Principals, Algorithms and Applications* 3rd *Edition,* Prentice Hall, 1996, pp. 23-28.

ITU Standard G.991.2, "Single Pair High Speed Digital Subscriber Line (SHDSL) Transceivers", Apr. 2001, pp. 1-191, Irvine, California.

ITU Standard G.994.1, "Handshake Procedures for Digital Subscriber Line (DSL) Transceivers", Jun. 1999, pp. 1-46, Geneva.

ANSI Standard HDSL2, "High Bit Rate Digital Subscriber Line-2nd Generation (HDSL2)", Feb. 21-25, 2000, pp. 1-94, Maui, HI.

Sistanizadeh, K. et al.; "Multi-tone transmission for asymmetric digital subscriber lines (ADSL)" *Proceedings of the International Conference on Communications (ICC),* Geneva; vol. 3, May 26, 1993, pp. 756-760 (XP010137079).

Friese, M. et al.; "Power back-off strategies for very high bit rate digital subscriber line transmission systems" *IEEE Global Telecommunications Conference, Globecom 99,* Rio De Janeiro, Brazil'; vol. 2, Dec. 5-9, 1999, pp. 1150-1154 (XP001016895).

Jacobsen, K. S.; "Text proposal for upstream power back-off" *ETSI TM6 Meeting (TD15),* Amsterdam, The Netherlands, Nov. 29, 1999 to Dec. 3, 1999 pp. 1-6 (XP002224208).

Leke, A. et al.; "Channel loading effects on power limited wireless transmitters utilizing discrete multi-tone modulation" *Microwave Symposium Digest, IEEE MTT-S International* Denver, CO USA, Jun. 8-13, 1997; pp. 1147-1150 (XP010228246).

* cited by examiner

METHOD AND SYSTEM FOR VARYING AN ECHO CANCELLER FILTER LENGTH BASED ON DATA RATE

CROSS REFERENCE TO RELATED APPLICATION

This application claims priority from provisional application Ser. No. 60/308,587, filed Jul. 31, 2001, entitled Method and System for Duplex Symmetric Transmission, which is incorporated by reference.

FIELD OF THE INVENTION

The present invention relates generally to communication systems providing duplex symmetric transmission, more particularly, to varying G.SHDSL echo canceller filter length based on data rate.

BACKGROUND OF THE INVENTION

Traditionally, a modem converts data between the analog form, used for communicating over telephone lines, and the digital form, used on computers for the purposes of computer processing and computer-to-computer communication. Generally, standard modems may transmit data at a maximum rate of 56,000 bits per second (bps) or 56kbps. However, inherent limitations of phone systems may translate to lower modem speeds and other limitations. Modems at a transmitting end modulate the digital data of computers into analog signals to send over telephone lines, such as Plain Old Telephone System (POTS). Then, modems at a destination receiving site demodulate the analog signals back into digital signals to be read by a destination computer on the other end. There are standards to ensure that modems made by different manufacturers can communicate with each other. For example, modems communicating with each other may be required to use the same speed and comply with other requirements.

More recently, modems for cable and Digital Subscriber Line (DSL) service have come to be known as digital modems while those used for traditional dial-up networking are referred to as analog modems. DSL technology provides high-speed, broadband network connections to homes, businesses and other users. DSL utilizes the same cabling used for normal telephones, while offering higher data rates and other advantages through the use of digital modem technology.

G.SHDSL is a standard that enables manufacturers and other entities to develop Central Office (CO) loop access equipment and Customer Premises Equipment (CPE) around a single standard, thereby increasing market share and decreasing component costs. As a symmetric multi-rate DSL, G.SHDSL can operate over a single pair of copper wires. For speed versatility, the technology can also be deployed over dual copper pairs. G.SHDSL has associated with it a global standard developed by the International Telecommunications Union's (ITU) Telecommunications Standards Sector based in Geneva. Higher bit rate and longer copper transmission line (or loop) are additional factors that strengthen G.SHDSL.

G.hs (handshake) protocol negotiates the highest achievable data rate given the loop conditions. Using the G.hs protocol during pre-activation, service type may be negotiated during start-up (e.g., training). With this protocol, the most efficient framing type may be negotiated to avoid unnecessary overhead and latency on the DSL link.

Optimization of various factors, such as power back off, determination of data rates, filter lengths, transmit power spectral density, and other factors, may affect modem and system performance.

Traditional methods for determining power back off (PBO) are generally computed in the time domain. Similarly, current methods for determining an optimal data rate involve calculating SNR in the time domain and providing an estimate of the capacity. Traditional methods for dynamically adapting the length of a filter result in higher costs and power consumption. Estimation of a base-2 logarithm of a number generally involves a separate polynomial for each range of input numbers or an expansion requiring a large number of terms, which are oftentimes complicated and difficult to implement.

Therefore, there is a need in the art of modem systems for a more efficient method and system for providing efficient communication between modems.

SUMMARY OF THE INVENTION

Aspects of the present invention overcome the problems noted above, and realize additional advantages. One such inventive aspect provides methods and systems for providing efficient use of available CPU cycles that may be achieved by reducing the length of the echo canceller filter. In addition, an echo canceller's adaptive algorithm may be implemented to reach a lower mean squared error (MSE) due to increased training time allowed by cycle reduction. Further, total power consumption of a processor may be reduced by reducing the number of multiplications (and/or other operations) that may be performed by an echo canceller filter for each time iteration. This may be achieved by not performing multiplications on taps that are not being used. In addition, for higher rates, a shorter echo canceller filter may be implemented by transmitting less energy at low frequencies. As a result, the temporal length of the echo channel may be shortened thereby reducing the total number of taps needed to model the channel. According to another embodiment of the present invention, the present invention may involve increasing performance by reducing CPU cycles per iteration and allowing for more echo canceller training time or the ability to track faster changes in the echo channel by allowing a faster update rate. The present invention provides a static adjustment that may occur before a single echo canceller training session.

According to an aspect of the present invention, a method for adapting a filter length of an echo canceller filter based on data rate comprises the steps of measuring a plurality of approximate filter lengths at a plurality of data rates; fitting a polynomial to a curve representing the approximate filter lengths at the plurality of data rates; inputting a selected data rate to a function of the polynomial for generating an approximate number of filter taps for modeling an echo channel for the selected data rate; and adjusting the number of filter taps based on the selected data rate; wherein a mean square error associated with the echo canceller filter is reduced.

Other features of the present invention include wherein a number of CPU cycles per filter coefficient update is reduced; wherein a number of echo canceller coefficient updates is increased by a reduction in CPU cycles; wherein the step of adjusting is a static adjustment; wherein the step of adjusting is prior to an echo canceller training session; wherein the curve is a linear curve; wherein training time of the echo canceller filter at lower rates is extended; wherein the filter length comprises a number of filter taps for modeling an echo channel; further comprising the step of determining an echo tail wherein the echo tail comprises a point where at least one filter coefficient decays to a value below a predetermined value towards an end of a filter; further comprising the step of varying the number of filter taps for compensating for the echo tail; wherein the value is approximately equal to one least significant bit; wherein the at least one filter coefficient approaches a noise floor; further comprising the step of detecting an analog delay, wherein the analog delay is a delay in time of an echo; further comprising the step of determining a section of filter taps towards a beginning of a filter, the section of filter taps approaching a quantization noise floor; further comprising the step of varying the number of filter taps for compensating for the analog delay; and wherein the modem operates according to the G.SHDSL standard.

According to another aspect of the present invention, in a communication network having a first modem in communication with a second modem over a communication channel, a system for adapting a filter length of an echo canceller filter based on data rate comprises a measuring module for measuring a plurality of approximate filter lengths at a plurality of data rates; a fitting module for fitting a polynomial to a curve representing the approximate filter lengths at the plurality of data rates; an input module for inputting a selected data rate to a function of the polynomial for generating an approximate number of filter taps for modeling an echo channel for the selected data rate; and an adjusting module for adjusting the number of filter taps based on the selected data rate; wherein a mean square error associated with the echo canceller filter is reduced.

Other features of the present invention include wherein a number of CPU cycles per filter coefficient update is reduced; wherein a number of echo canceller coefficient updates is increased by a reduction in CPU cycles; wherein the adjusting module performs static adjustment; wherein the adjusting module performs an adjustment prior to an echo canceller training session; wherein the curve is a linear curve; wherein training time of the echo canceller filter at lower rates is extended; wherein the filter length comprises a number of filter taps for modeling an echo channel; an echo tail determining module for determining an echo tail wherein the echo tail comprises a point where at least one filter coefficient decays to a value below a predetermined value towards an end of a filter; a varying module for varying the number of filter taps for compensating for the echo tail; wherein the value is approximately equal to one least significant bit; wherein the at least one filter coefficient approaches a noise floor; a detecting module for detecting an analog delay, wherein the analog delay is a delay in time of an echo; a filter tap determining module for determining a section of filter taps towards a beginning of a filter, the section of filter taps approaching a quantization noise floor; a varying module for varying the number of filter taps for compensating for the analog delay; and wherein the modem operates according to the G.SHDSL standard.

According to another aspect of the present invention, a method for adapting a filter length of an echo canceller filter based on data rate comprises the steps of initiating a line probe session; performing an abbreviated echo canceller training during the line probe session for determining a length of an echo tail; estimating a number of taps for the echo canceller filter based on the abbreviated echo canceller training; and adjusting the number of taps; wherein a mean square error associated with the echo canceller filter is reduced.

Other features of the present invention include the step of calculating a mean filter wherein $$y_k = \frac{1}{10} \sum_{i=o}^{9} w_{k-i} \quad k = 0, 1 \cdots M-1$$

where M represents a maximum length in taps of the echo canceller filter and w represents filter coefficients, determining whether $Y_k$ drops below a predetermined threshold, and truncating the echo canceller filter by discarding one or more remaining taps below the predetermined threshold; and wherein the predetermined threshold is determined by $$20\log_{10}\left(\frac{T}{2^{15}}\right) = -80$$

where $T = 2^{15} 10^{\frac{-80}{20}} = 3.2768$.

According to another aspect of the present invention, in a communication network having a first modem in communication with a second modem over a communication channel, a system for adapting a filter length of an echo canceller filter based on data rate comprises a line probe module for initiating a line probe session; a training module for performing an abbreviated echo canceller training during the line probe session for determining a length of an echo tail; an estimating module for estimating a number of taps for the echo canceller filter based on the abbreviated echo canceller training; and an adjusting module for adjusting the number of taps; wherein a mean square error associated with the echo canceller filter is reduced.

Other features of the present invention include a calculating module for calculating a mean filter wherein $$y_k = \frac{1}{10} \sum_{i=o}^{9} w_{k-i} \quad k = 0, 1 \cdots M-1$$

where M represents a maximum length in taps of the echo canceller filter and w represents filter coefficients, a determining module for determining whether $Y_k$ drops below a predetermined threshold, and a truncating module for truncating the echo canceller filter by discarding one or more remaining taps below the predetermined threshold; and wherein the predetermined threshold is determined by $$20\log_{10}\left(\frac{T}{2^{15}}\right) = -80$$

where $T = 2^{15} 10^{\frac{-80}{20}} = 3.2768$.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which.

LIST OF ACRONYMS

Figure 1A:
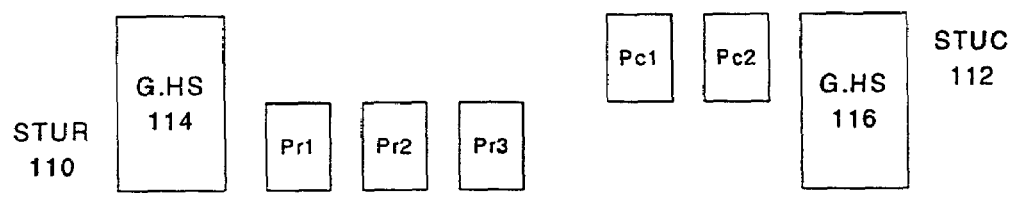
FIG. 1a is a block diagram illustrating an example of a line probe session, according to an embodiment of a first aspect of the present invention.

ADC—Analog Digital Converter
AFE—Analog Front End
AGC—Automatic Gain Control
ANSI—American National Standard Institute
AR—autoregressive
ARMA—autoregressive moving average
ATM—Asynchronous Transfer Mode
AWG—American Wire Gauge
AWGN—additive white and gaussian
bps—bits per second
BER—bit error rate
CO—Central Office
CPE—Customer Premises Equipment
CPU—central processing unit
CRL—clock recovery loop
DAC—Digital Analog Converter
DAGC—Digital automatic gain control
DAV—Digital Audio Video
DFT—discrete Fourier transform
DMT—Discrete Multi-Tone
DSL—Digital Subscriber Line
DSLAMs—DSL Access Multiplexers
EC—echo canceller
EPL—estimated power loss
EQ—Equalizer
ETSI—European Telecommunications Standard Institute
FF—Feed Forward
FIR—Finite Impulse Response
FFT—Fast Fourier Transform
G.hs—handshake
HDSL—High Speed Digital Subscriber Line
IAD—Integrated Access Devices
ITU—International Telecommunications Union
IV—REF—Current and Voltage Reference Generator
LA—loop attenuation
LP—line probe
LSB—least significant bit
MA—moving average
MIPS—Million Instructions Per Second
MMSE—Minimum Mean Squared Error
MSB—most significant bit
MSE—mean squared error
NEXT—near end cross talk
NEXT PSD—near end cross talk power spectral density
PAC—programmable attenuation control
PAR—peak-to-average ratio
PBO—power back off
PGA—programmable gain amplifier
PHY—Physical Layer Device PLL—Phase Locked Loop
POTS—Plain Old Telephone System
PSD—power spectral density
QMF—quadrature mirror filter
RISC—Reduced Instruction Set Computing
ROI—rate of interest
Rx—Receive
S—D—Sigma-Delta
SDSL—Synchronous Digital Subscriber Line
SNMP—Simple Network Management Protocol
SNR—signal to noise ratio
SOHO—small office/home office
STM—Synchronous Transfer Mode
STUC—SHDSL Transceiver Unit-Central Office
STUR—SHDSL Transceiver Unit-Remote End
TPS—TC—Transmission Protocol Specific-Transmission Convergence
Tx—Transmit
USB—Universal Serial Bus
VCXO DAC—Volt Controlled Oscillator Digital Analog Converter

DETAILED DESCRIPTION OF THE INVENTION

The following description is intended to convey a thorough understanding of the invention by providing a number of specific embodiments and details involving modems applications. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to determining maximum power backoff for a G.SHDSL modem using frequency domain geometric signal to noise ratio (SNR). A G.SHDSL standard may specify a minimum power back off (PBO) for modem implementation. Power back-off may be specified as an amount of PBO in dB for an estimated line loss. Although the standard specifies a minimum back off, it is desirable to be able to increase the PBO beyond the minimum. The reasons for this may include reduced power consumption and reduced crosstalk generated by a modem. An aspect of the present invention discloses a method and system for determining an absolute maximum power PBO that may be tolerated and still meet bit error rate (BER) and/or other requirements. According to another embodiment, the present invention implements a geometric mean to compute SNR in a frequency domain over a pass-band of a transmit spectrum.

During a line probe session, a G.SHDSL modem may determine, among other things, the level of PBO that the modem may support given the line conditions. FIG. 1a illustrates a line probe (LP) session for G.HS (e.g., 114, 116) between SHDSL Transceiver Unit-Central Office (STUR) 110 and SHDSL Transceiver Unit-Remote End (STUC) 112, which may last a maximum of approximately 10 seconds, for example.

During the transmission of each probe signal, represented by Prx (e.g., Pr1, Pr2, Pr3) and Pcx (e.g., Pc1, Pc2) in FIG. 1a, the modem transmitting the probe may train an associated automatic gain control (AGC) and echo canceller (EC). It may then measure a residual echo signal and use this signal as an estimate of the noise spectrum. In addition, the modem may measure a silence power spectrum during segments where no signals are transmitted. This measurement may be used for a noise spectrum estimate. The modem receiving the probe signal may measure its received signal and noise spectrum. One modem may transmit a probe signal at any given time.

When the modems are not measuring received signals, the modems may calculate a sub-band SNR for each rate using the methods described below and assign a PBO value for the given rate.

Figure 1B:
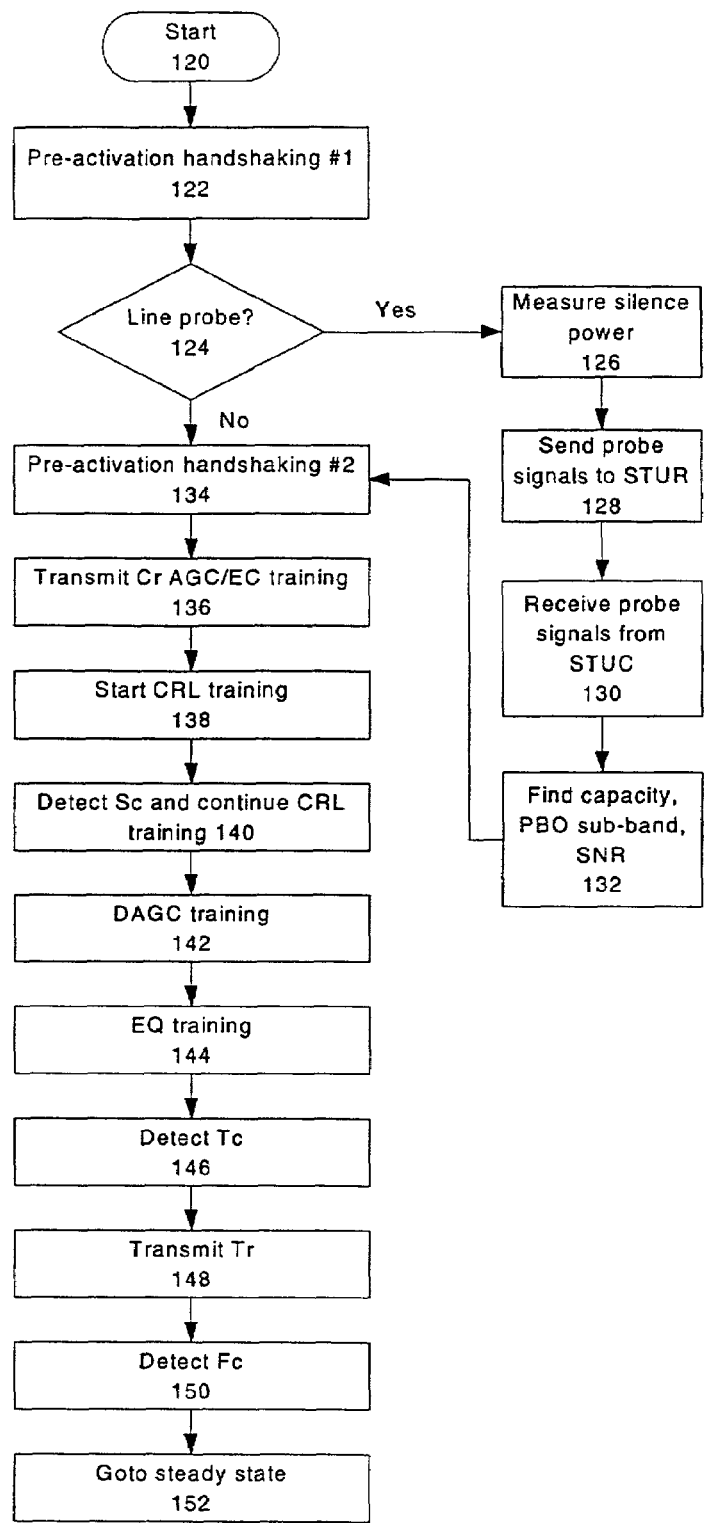
FIG. 1b is a flowchart illustrating a line probe session for STUR, according to an embodiment of a first aspect of the present invention.
Figure 1C:
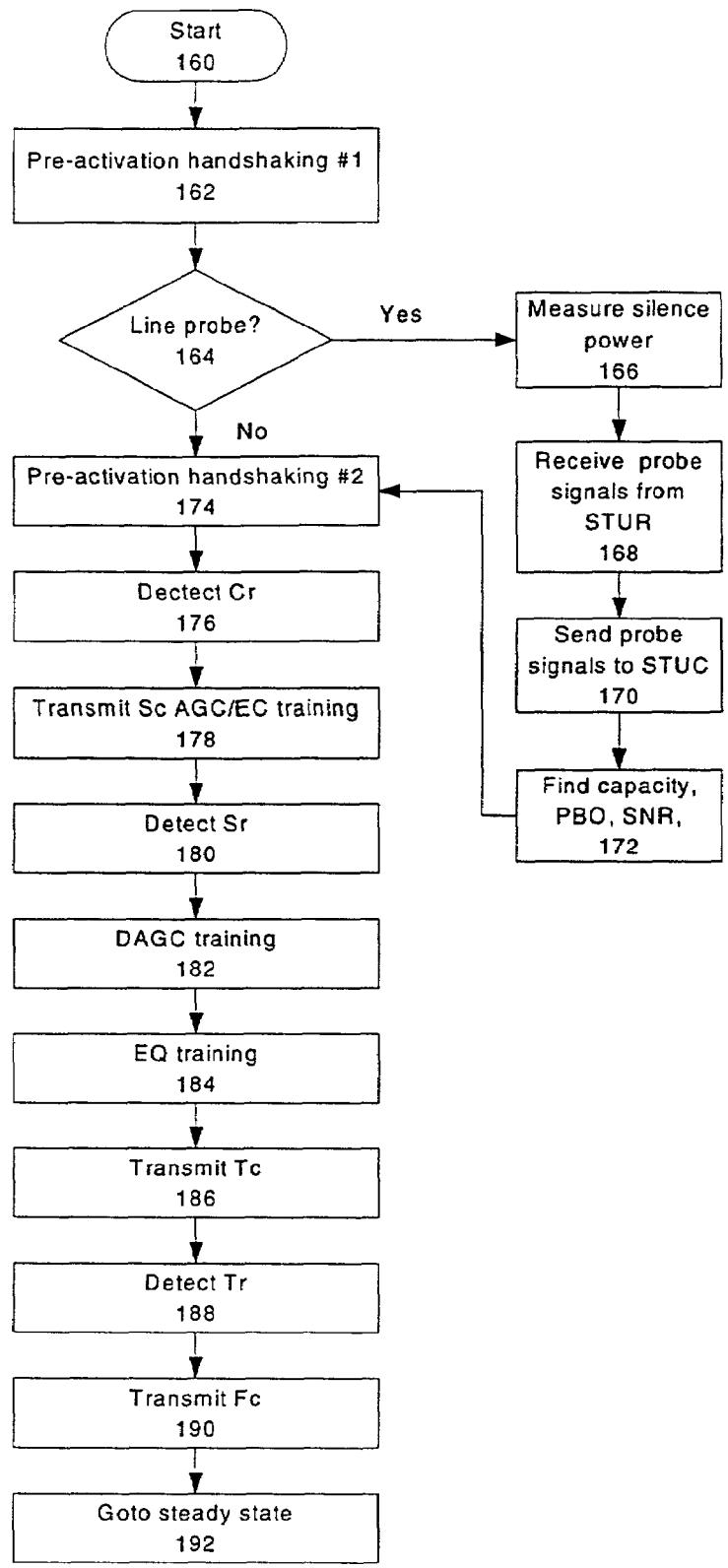
FIG. 1c is a flowchart illustrating a line probe session for STUC, according to an embodiment of a first aspect of the present invention.

FIG. 1b is a flowchart illustrating a line probe session for STUR and FIG. 1c is a flowchart illustrating a line probe session for STUC.

In FIG. 1b, a line probe session for STUR may be initiated at start 120. At step 122, a first pre-activation handshaking may be performed. At step 124, a line probe may be initiated. If the line probe is initiated, silence power may be measured, at step 126. Probe signals may be sent to STUR, at step 128. Probe signals may be received from STUC, at step 130. Capacity, Power back off (PBO) sub-band and signal-to-noise (SNR) may be determined, at step 132. Other calculations and/or factors may be determined as well. A second pre-activation handshaking may be performed at step 134. Cr (which represents a remote unit training signal) Automatic Gain Control (AGC)/echo canceller (EC) training may be transmitted, at step 136. Clock recovery loop (CRL) training may be initiated at step 138. Sc (which represents a central office unit training signal) may be detected and CRL training may continue, at step 140. Digital automatic gain control (DAGC) training may be performed, at step 142. Equalizer (EQ) training may be performed, at step 144. Tc (which represents a central office unit training signal) may be detected, at step 146. Tr (which represents a remote unit training signal) may be transmitted, at step 148. Fc (which represents a central office unit training signal) may be detected, at step 150. At step 152, steady state may be achieved.

In FIG. 1c, a line probe session for STUC may be initiated, at start 160. At step 162, a first pre-activation handshaking may be performed. At step 164, a line probe may be initiated. If the line probe is initiated, silence power may be measured, at step 166. Probe signals may be received from STUC, at step 168. Probe signals may be sent to STUR, at step 170. Capacity, PBO, and SNR may be determined, at step 172. Other calculations and/or factors may be determined as well. A second pre-activation handshaking may be performed, at step 174. Cr may be detected, at step 176. Sc AGC/EC training may be transmitted, at step 178.

Figure 1D:
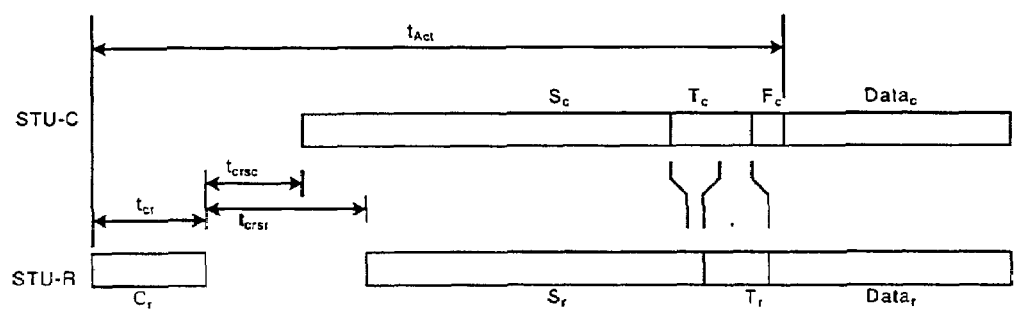
FIG. 1d is timing diagram, according to an embodiment of a first aspect of the present invention.

FIG. 1d is an example of a timing diagram of an activation sequence. As illustrated, STUR may initiate Cr, lasting a duration of $t_{cr}$, which has a nominal value of 1 second with ±20 millisecond tolerance. Time from the end of Cr to a beginning of Sc is represented by $t_{crsc}$, which has a nominal value of 500 millisecond with ±20 millisecond tolerance. After a time $t_{crsc}$, STUC may initiate Sc. Time from the end of Cr to a beginning of Sr is represented by $t_{crsr}$, which has a nominal value of 1.5 second with ±20 millisecond tolerance. After a time $t_{crsr}$, STUR may initiate Sr. After Sc, STUC may initiate Tc. After Sr, STUR may initiate Tr. After Tc, STUC may initiate Fc. At approximately the same time, $Data_c$ and $Data_r$ may be initiated by STUC and STUR, respectively. Time from the beginning of Cr to the beginning of $Data_r$ is represented by $t_{Actdata}$, which has a nominal value of 15 seconds.

If the SNR is calculated in the time domain, one method to determine PBO is according to the equations shown below.

$$SNR_{dB} = 10\log_{10}\left(\frac{P_{signal+noise}}{P_{noise}}\right) = 10\log_{10}\left(\frac{\sum_{n=0}^{M-1}|[s(n)+w(n)]|^2}{\sum_{n=0}^{M-1}|w(n)|^2}\right) \quad (1)$$

$$PBO_{dB} = SNR_{dB6} - (\gamma + \delta + SNR_{min}) \quad (2)$$

$s(n) = n^{th}$ sample of the received signal
$w(n) = n^{th}$ sample of the received noise
M=window length in samples used to compute average
$P_{signal+noise}$=power of signal+noise
$P_{noise}$=power of noise only where $\gamma$ represents a required margin in dB ($\geq 0$ dB, example: G.SHDSL Annex B margin is 6 dB); $SNR_{min}$ represents a minimum SNR in dB needed to obtain the specified BER, and $\delta$ represents an implementation loss in dB.

A problem with this estimate is not being localized in frequency. Finding the noise and signal powers as shown in (1) and (2) above may be the equivalent of integrating under the entire frequency domain PSD. For a sub-band of the total frequency band, this estimate may not produce the desired results.

Figure 2:
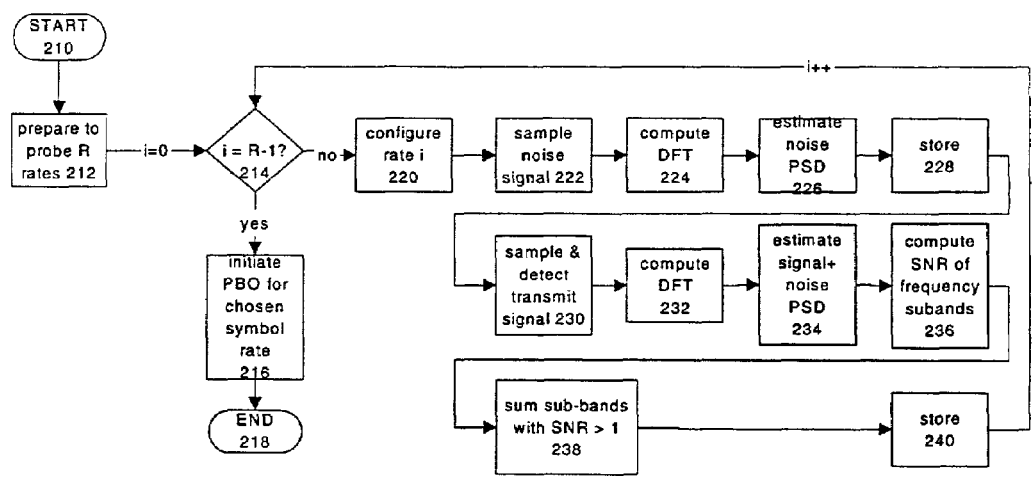
FIG. 2 is a flowchart illustrating a line probe session with a sub-band SNR calculation, according to an embodiment of the first aspect of the present invention.

According to an embodiment of the present invention, PBO selection may be based on a sub-band SNR calculation. FIG. 2 illustrates a flowchart for a line probe session with a sub-band SNR calculation, according to an embodiment of the present invention. At step 210, a line probe session may be initiated. At step 212, a process for preparing to probe R rates may be initiated. At step 214, it may be determined whether i=R-1, where i represents an index for the rate. If so, PBO may be initiated for a chosen symbol rate, at step 216. The line probe session may be terminated at step 218. If i does not equal R-1, rate i may be configured, at step 220. At step 222, a noise signal may be sampled. At step 224, a discrete Fourier transform (DFT) may be computed for the noise signal. At step 226, noise power spectral density (PSD) may be estimated for the noise signal. At step 228, relevant information may be stored. At step 230, a transmit signal may be sampled and detected. At step 232, a DFT may be computed for the transmit signal. At step 234, a signal and noise PSD may be estimated. At step 236, a SNR of frequency sub-bands may be computed. At step 238, sub-bands satisfying a condition (e.g., SNR>1) may be summed. At step 240, relevant information may be stored. Following step 240, the process may return to step 214 to again determine whether i=R-1, where the variable i has been increased by a predetermined value (as shown by i++). For verification of a symbol rate with the new PBO value, the line probe can be restarted with a new PBO.

According to an embodiment of the present invention, to compute the SNR based on frequency domain data, power spectrums of the signal and noise may be determined, as shown in the equations below.

$$Y(k) = \frac{1}{N}\sum_{n=0}^{N-1}[s(n)+w(n)]\exp\left(\frac{-2\cdot\pi\cdot j\cdot k\cdot n}{N}\right) = S(k) + W(k) \quad (3)$$

$$W(k) = \frac{1}{N}\sum_{n=0}^{N-1}w(n)\exp\left(\frac{-2\cdot\pi\cdot j\cdot k\cdot n}{N}\right) \quad (4)$$

$s(n)=n^{th}$ time sample of the received signal
$w(n)=n^{th}$ time sample of the received noise
N=window length in time samples used to compute spectrum
$S(k)=k^{th}$ frequency suband of the received signal spectrum
$W(k)=k^{th}$ frequency suband of the received noise spectrum
$Y(k)=k^{th}$ frequency suband of signal plus noise spectrum
$j=\sqrt{-1}$ where S(k) represents a DFT of the signal; W(k) represents a DFT of noise; Y(k) represents a DFT of signal-plus-noise; s(n) represents a transmit signal; w(n) represents a noise signal.

According to an embodiment of the present invention, these transforms may be computed with Fast Fourier Transform (FFT). A real 2N input sequence may be packed into an N point complex sequence as shown below. According to an embodiment of the present invention, transform weights may be computed on the fly using the method shown below. Frequency cells may be estimated using a number of methods other than a conventional DFT, such as autoregressive (AR), moving average (MA), autoregressive moving average (ARMA), quadrature mirror filter (QMF) filter bank, and other methods.

To illustrate a geometric SNR, a geometric mean may be defined as follows:

$$mean_{geometric} = \left(\prod_{i=0}^{M-1} a_i\right)^{\frac{1}{M}} \quad (5)$$

$a_i=i^{th}$ sample used for average
M=window size in samples used for average

Using the geometric mean, a SNR of the channel may be computed using the following:

$$SNR \cong \left[\left[\prod_{k=\alpha}^{\beta}\frac{|Y(k)-\hat{W}(k)|^2}{|W(k)|^2}\right]^{\frac{1}{\beta-\alpha+1}}\right] \quad (6)$$

$$SNR \cong 10\log_{10}\left[\left[\prod_{k=\alpha}^{\beta}\frac{|Y(k)-\hat{W}(k)|^2}{|W(k)|^2}\right]^{\frac{1}{\beta-\alpha+1}}\right] \quad (7)$$

$$= \frac{10}{\beta-\alpha+1}\sum_{k=\alpha}^{\beta}\log_{10}\left[\frac{|\hat{S}(k)|^2}{|W(k)|^2}\right]$$

which may be rewritten in the following manner to filter cells with negative or zero SNR $$D'_k = \log_{10}\left[\frac{|\hat{S}(k)|^2}{|W(k)|^2}\right] \quad (8)$$

-continued $$D_k = \begin{cases} D'_k & D'_k > 0 \\ 0 & \text{otherwise} \end{cases} \quad (9)$$

$$SNR_{dB} = \frac{10}{\beta - \alpha + 1}\left(\sum_{k=\alpha}^{\beta} D_k\right) \quad (10)$$

where $0<\alpha<\beta<N-1$; $\hat{S}(k)$ represents an estimate of $k^{th}$ frequency sub-band of a received signal spectrum; $\hat{W}(k)$ represents an estimate of $k^{th}$ frequency sub-band of a received noise spectrum; $Y(k)$ represents a $k^{th}$ frequency sub-band of signal plus noise spectrum; $\alpha$ represents a starting sub-band; $\beta$ represents an ending sub-band; $D_k$ represents one or more sub-bands with SNR greater than zero; $D'_k$ represents SNR for $k^{th}$ sub-band.

Figure 3A:
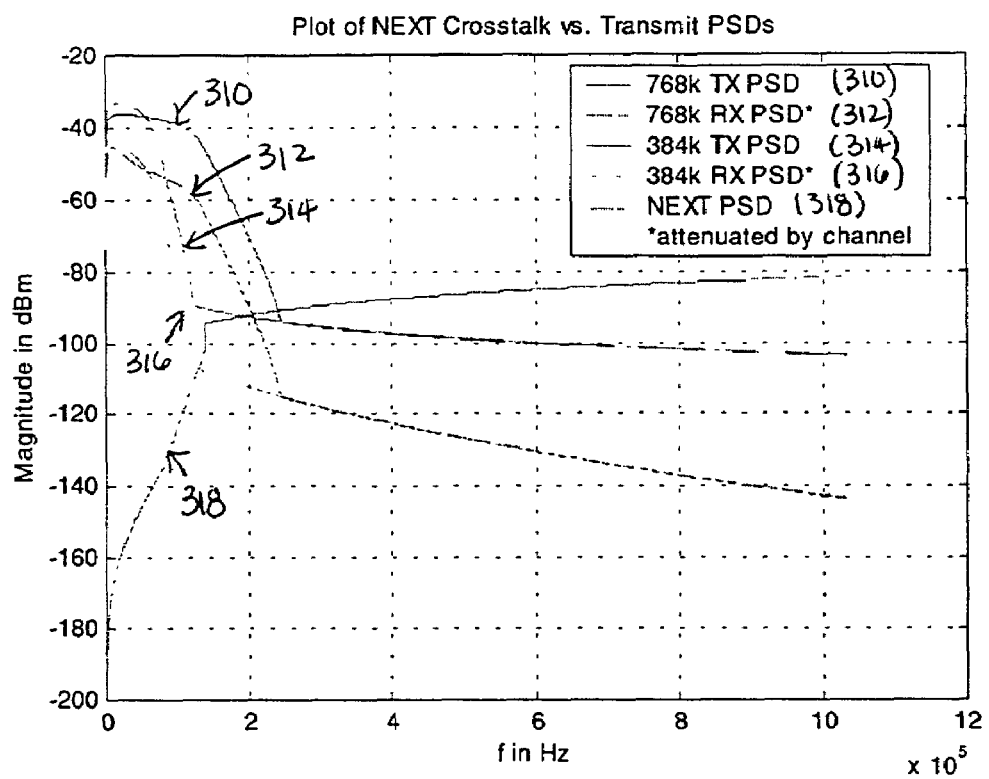
FIG. 3a is a chart illustrating a noise scenario, according to an embodiment of the first aspect of the present invention.
Figure 3B:
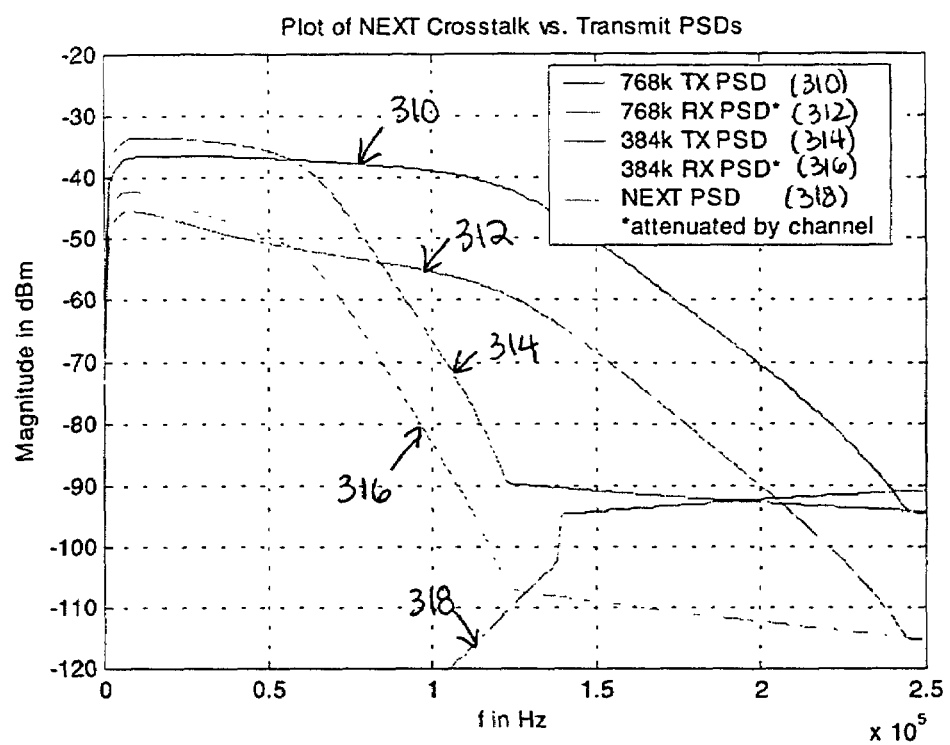
FIG. 3b is a chart illustrating a noise scenario, according to an embodiment of the first aspect of the present invention.

The following example illustrates a sub-band SNR calculation where the sub-band approach may be used to optimally shape a spectrum for maximum power back off. The FIGS. 3a, 3b, 4a and 4b illustrate two data rates, 768,000 bps and 384,000 bps. FIGS. 3a and 3b show the transmitted and received spectrums as well as the near-end crosstalk power spectral density (NEXT PSD), which is essentially the received noise spectrum.

FIGS. 3a and 3b illustrate a noise scenario including 30 NEXT disturbers of ADSL downstream with a loop length of 5000 feet of 26 AWG twisted-pair, which is the noise spectrum generated by 30 twisted pair ADSL modems in the same wire bundle as the modem being simulated, according to an embodiment of the present invention. As can be seen by these plots, most of the noise energy is concentrated outside of the transmission band of the modem. More specifically, plot 310 represents 768k TX PSD, plot 312 represents 768k RX PSD, plot 314 represents 384k TX PSD, plot 316 represents 384 RX PSD, and plot 318 represents NEXT PSD wherein RX plots 312 and 316 may be attenuated by the channel. When the SNR is computed in the time domain, some or all of out of band noise may be averaged in a SNR estimate. The SNR estimate may be considered conservative as much of the out of band noise may be removed with a receive filter and equalizer, for example. If the power cutback is based on this time domain SNR, it may also be considered conservative. Thus, using the sub-band SNR, in accordance with the present invention, provides the ability to back off the power more aggressively.

Figure 4A:
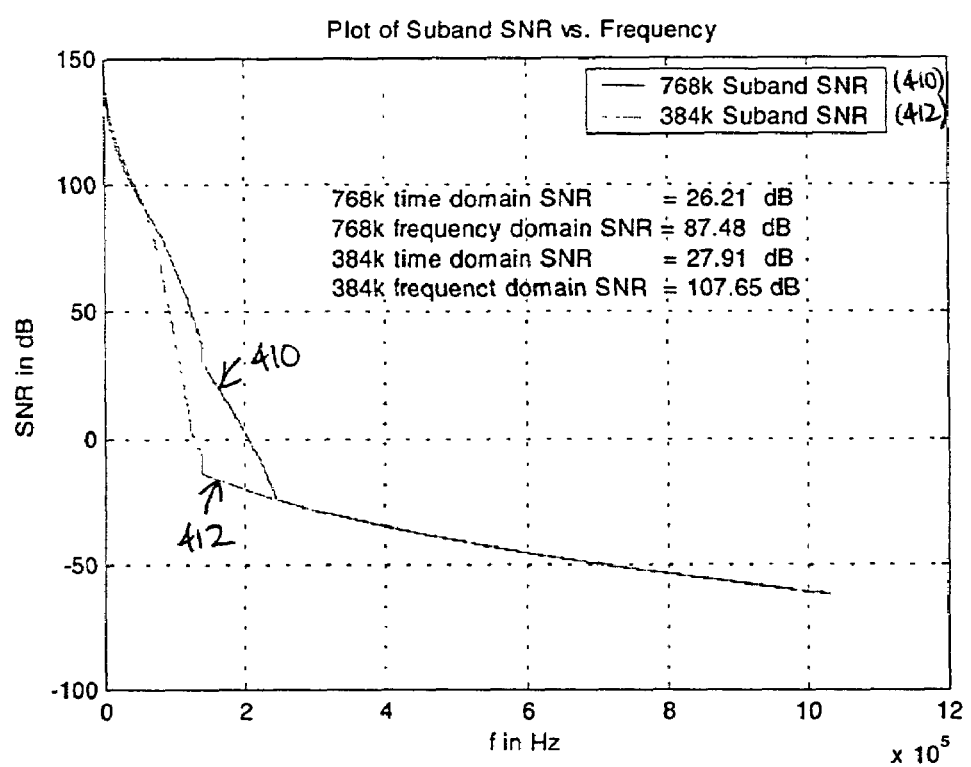
FIG. 4a is a chart illustrating a sub-band SNR, according to an embodiment of the first aspect of the present invention.
Figure 4B:
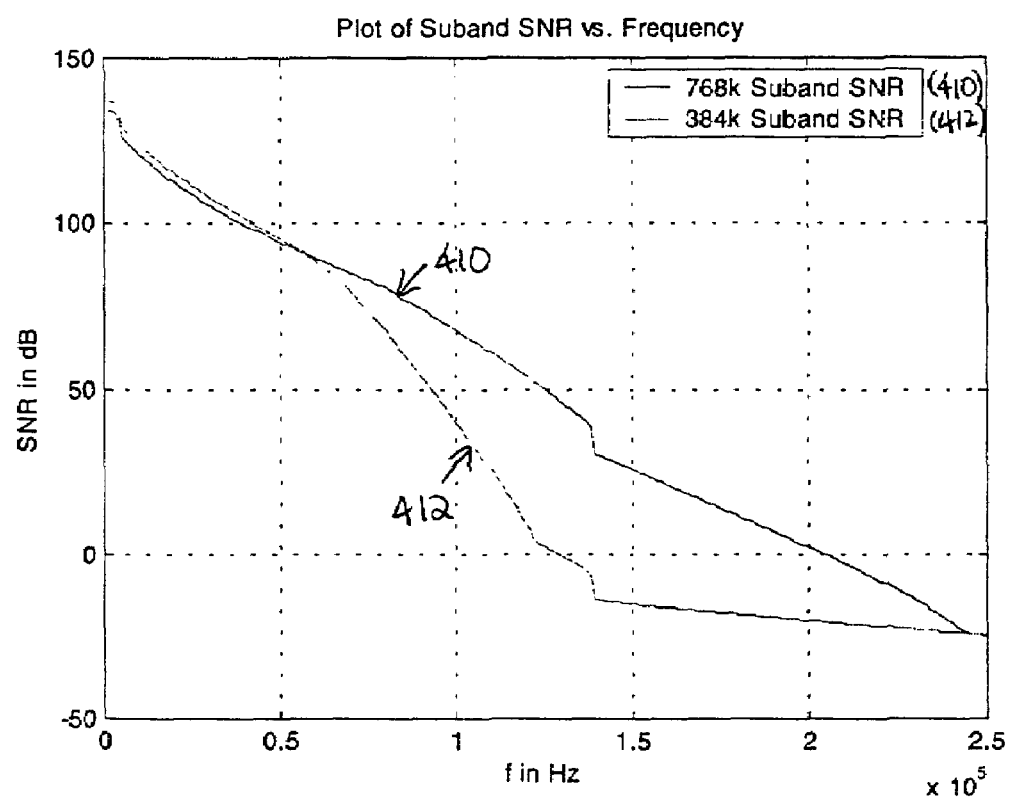
FIG. 4b is a chart illustrating a sub-band SNR, according to an embodiment of the first aspect of the present invention.

FIGS. 4a and 4b illustrate a sub-band SNR, according to an embodiment of the present invention. As illustrated, frequency domain SNR for certain frequencies may be significantly higher than time domain numbers included on the plot. Plot 410 represents 768k sub-band SNR and plot 412 represents 384k sub-band SNR, as shown in FIGS. 4a and 4b. For example, if the required SNR to achieve the minimum BER is 24 dB, the time domain SNR for 768 k may suggest a maximum of approximately 2 dB PBO. However, looking at the frequency domain SNR computed with the geometric mean across a transmission band, with an average SNR of 87.48 dB, the PBO may be significantly more. For example, 26.21 (SNR time) minus 24 (min BER) equals 2.21 dB while 87.48 minus 24.00 equals 63.48 dB.

One way to achieve a maximum (or optimal) PBO involves shaping the spectrum such that frequencies with the highest SNR are attenuated the most and frequencies where the SNR is close to the threshold are not cutback or minimally cutback. For example, as shown in FIGS. 4a and 4b, the SNR may increase as frequency decreases. The filter's spectral shape may gradually increase the transmitted power with increasing frequency, maintaining an approximately constant SNR throughout the passband.

The following equations illustrate a method for packing a 2N-point real input signal into an N-point complex input for efficient computation of the FFT.

$$y(n)=s(2n)+js(2n+1)=h(n)+jg(n) \quad (11)$$

where $n=0,1\ldots N-1$ $$Y(k) = \frac{1}{N}\sum_{n=0}^{N-1} y(n)\exp\left(\frac{-2\cdot\pi\cdot j\cdot k\cdot n}{N}\right) = R(k) + jI(k) \quad (12)$$

$$S_R(k) = \frac{1}{2}[R(k) + R(N-k)] + \frac{1}{2}\cos\left(\frac{\pi k}{N}\right) \quad (13)$$

$$[I(k) + I(N-k)] - \frac{1}{2}\sin\left(\frac{\pi k}{N}\right)[R(k) - R(N-k)]$$

$$S_I(k) = \frac{1}{2}[I(k) - I(N-k)] + \frac{1}{2}\sin\left(\frac{\pi k}{N}\right) \quad (14)$$

$$[I(k) + I(N-k)] - \frac{1}{2}\cos\left(\frac{\pi k}{N}\right)[R(k) - R(N-k)]$$

Equations (11) to (14) are described in "The Fast Fourier Transforms and it's Applications" by E. Oran Brigham-1988-FIG. 9.15, page 193.

A recursive calculation of FFT weights may be implemented to save storage space until FFT is performed.

$$\exp\left(-\frac{2\cdot\pi\cdot j\cdot n\cdot k}{N}\right) = \cos\left(\frac{2\cdot\pi\cdot n\cdot k}{N}\right) - j\sin\left(\frac{2\cdot\pi\cdot n\cdot k}{N}\right) \quad (15)$$

Equation (15) is described in "The Fast Fourier Transforms and it's Applications" by E. Oran Brigham-1988-equation 6.16, page 97.

The first cosine and sine terms may be found using the equations below.

$$R_0 = \cos\left(\frac{4\pi}{N_{real}}\right) \quad (16)$$

$$I_0 = -\sin\left(\frac{4\pi}{N_{real}}\right) \quad (17)$$

where
$N_{real}$=real FFT size
$R_0$=zero$^{th}$ sample of real part of exponential weight
$I_0$=zero$^{th}$ sample of imaginary part of exponential weight The equations to recursively compute the transform weights are given below:

$$R_m = R_0 \cdot R_{m-1} - I_0 \cdot I_{m-1} \quad (18)$$

$$I_m = I_0 \cdot R_{m-1} + R_0 \cdot I_{m-1} \quad (19)$$

where $m = 1, 2, \ldots \frac{N_{real}}{4}$ $R_m$=m$^{th}$ sample of real part of exponential weight
$I_m$=m$^{th}$ sample of imaginary part of exponential weight Since the input to the FFT is real, it may be more efficient to form a complex input to the FFT and then unpack the results to obtain the spectrum of the original real signal. This may involve the computation of additional weights as shown in equations (20) and (21).

$$R_p = \cos\left(\frac{2 \cdot \pi \cdot p}{N_{real}}\right) \qquad (20)$$

$$I_p = \sin\left(\frac{2 \cdot \pi \cdot p}{N_{real}}\right) \text{ where} \qquad (21)$$

$$p = 1, 2 \cdots \frac{N_{real}}{2}$$

$R_p = p^{th}$ sample of cosine recombination weights
$I_p = p^{th}$ sample of sine recombination weights To avoid calling the sine and cosine function for each weight, the identity for computing the weights recursively may be derived as in equations (18) and (19) above.

Starting with the trigonometric identities below, a recursive equation may be used to find the terms in (20) and (21).

$$\cos(A \pm B) = \cos(A)\cos(B) \mp \sin(A)\sin(B) \qquad (22)$$

$$\sin(A \pm B) = \sin(A)\cos(B) \pm \cos(A)\sin(B) \qquad (23)$$

$$\begin{aligned}
R_p &= \cos\left(\frac{2 \cdot \pi \cdot p}{N_{real}}\right) = \cos\left(\frac{2 \cdot \pi}{N_{real}} + \frac{2 \cdot \pi \cdot (p-1)}{N_{real}}\right) \\
&= \cos\left(\frac{2 \cdot \pi}{N_{real}}\right)\cos\left(\frac{2 \cdot \pi \cdot (p-1)}{N_{real}}\right) - \\
&\quad \sin\left(\frac{2 \cdot \pi}{N_{real}}\right)\sin\left(\frac{2 \cdot \pi \cdot (p-1)}{N_{real}}\right)
\end{aligned} \qquad (24)$$

$$\begin{aligned}
I_p &= \sin\left(\frac{2 \cdot \pi \cdot p}{N_{real}}\right) = \sin\left(\frac{2 \cdot \pi}{N_{real}} + \frac{2 \cdot \pi \cdot (p-1)}{N_{real}}\right) \\
&= \sin\left(\frac{2 \cdot \pi}{N_{real}}\right)\cos\left(\frac{2 \cdot \pi \cdot (p-1)}{N_{real}}\right) + \\
&\quad \cos\left(\frac{2 \cdot \pi}{N_{real}}\right)\sin\left(\frac{2 \cdot \pi \cdot (p-1)}{N_{real}}\right)
\end{aligned} \qquad (25)$$

This gives a recursion similar to that in equations (16), (17), (18) and (19) above. This is further illustrated in equations (26) and (27) below.

$$R_0 = \cos\left(\frac{2 \cdot \pi}{N_{real}}\right) \qquad (26)$$

$$I_0 = \sin\left(\frac{2 \cdot \pi}{N_{real}}\right) \qquad (27)$$

where
$N_{real}$ = real FFT size

Equations (18) and (19) may be modified slightly and then used with the above initializers to compute the new weights.

$$R_m = R_0 \cdot R_{m-1} - I_0 \cdot I_{m-1} \qquad (28)$$

$$I_m = I_0 \cdot R_{m-1} + R_0 \cdot I_{m-1} \qquad (29)$$

where $m = 1, 2, \cdots \frac{N_{real}}{2}$

Another embodiment of the present invention may be directed to determining an optimal G.SHDSL data rate using sub-band capacity. In the G.SHDSL standard, provisions may be made for rate negotiation to take place between two communicating modems after a line probe (LP) session. During LP, a first modem transmits a signal while a second modem samples a received signal to determine effects of line conditions on a communications channel. For example, performing a signal-to-noise-ratio (SNR) calculation in the time-domain gives an indication of an amount of signal power above that of the background noise. A problem may arise when this SNR value is used to compute the capacity of the channel since the capacity theorem, as described below, makes an assumption that the noise is additive white and gaussian (AWGN). When residue echo and NEXT noise are taken into consideration, the noise is no longer AWGN. In fact, the noise may not have been true AWGN.

The present invention provides an approach to rate negotiation that implements a geometric frequency domain approximation of channel capacity. The capacity for a plurality of M frequency sub-bands may be computed to find an overall capacity for a rate of interest (ROI). The sub-bands may be any segment of a total N frequency bands found with a discrete Fourier transform (DFT) or other method of spectrum estimation, such as an autoregressive (AR), moving average (MA), autoregressive-moving average (ARMA), quadrature mirror filter bank (QMF), and other methods. This geometric capacity may allow for a more accurate capacity calculation if the sub-band width is sufficiently small such that the noise within that band is approximately AWGN.

As shown in FIG. 1a, during a line probe session, the G.SHDSL modem may determine which rates the modem may support given the line conditions. FIG. 1a illustrates the line probe (LP) session for G.HS (e.g., 114, 116) between STUR 110 and STUC 112, which lasts a maximum of approximately 10 seconds, for example.

During the transmission of each probe signal, represented by Prx (e.g., Pr1, Pr2, Pr3) and Pcx (e.g., Pc1, Pc2) in FIG. 1a, a modem transmitting the probe may train associated automatic gain control (AGC) and echo canceller (EC). The modem may then measure the residual echo signal and use this measurement as an estimate of the noise spectrum. In addition, the modem may measure a silence power spectrum during the segments where no signals are transmitted and use this measurement as a noise spectrum estimate. The modem receiving the probe signal may measure a received signal and noise spectrum. One modem may transmit a probe signal at any given time.

When the modems are not measuring received signals, the modems may calculate sub-band capacity for each rate using the methods described.

If the SNR is calculated in the time domain, a method to compute the capacity may include measuring the silence power (noise), $P_{noise}$, and then the received power (signal+noise), $P_{signal+noise}$, and finding the capacity, C, using the equation below.

$$\begin{aligned}
C &= B\log_2\left(1 + \frac{P_{signal}}{P_{noise} 10^{\frac{(\Gamma - G + \gamma + \delta)}{10}}}\right) \\
&= B\log_2\left(1 + \frac{SNR}{10^{\frac{(\Gamma - G + \gamma + \delta)}{10}}}\right) \frac{\text{bits}}{\text{second}}
\end{aligned} \qquad (30)$$

where Γ represents a gap from a theoretical channel capacity for PAM signals, in dB; G represents a coding gain of a Trellis decoder in dB; B represents a transition bandwidth; γ represents a required margin in dB (e.g., G.SHDSL Annex B margin is approximately 6 dB); and δ represents an implementation loss in dB.

A problem with this estimate is not being localized in frequency. This may pose a problem when the noise is not AWGN. Using the sub-band capacity approach of the present invention, a frequency domain may be separated into narrow bands so that the signal and noise power for each sub-band may be determined. Capacity for each sub-band may be estimated using (30) above. According to an embodiment of the present invention, the noise within each sub-band may be assumed to be approximately AWGN. The more finely the signal spectrum is sampled, the closer the noise in each sub-band approximates AWGN. The geometric capacity may be computed to find a single number that may be compared between rates to determine an optimal (or best) rate of transmission. A simple way of separating the frequency domain into sub-bands is using the Discrete Fourier Transform (DFT), which is essentially a bank of band-pass filters.

Figure 5:
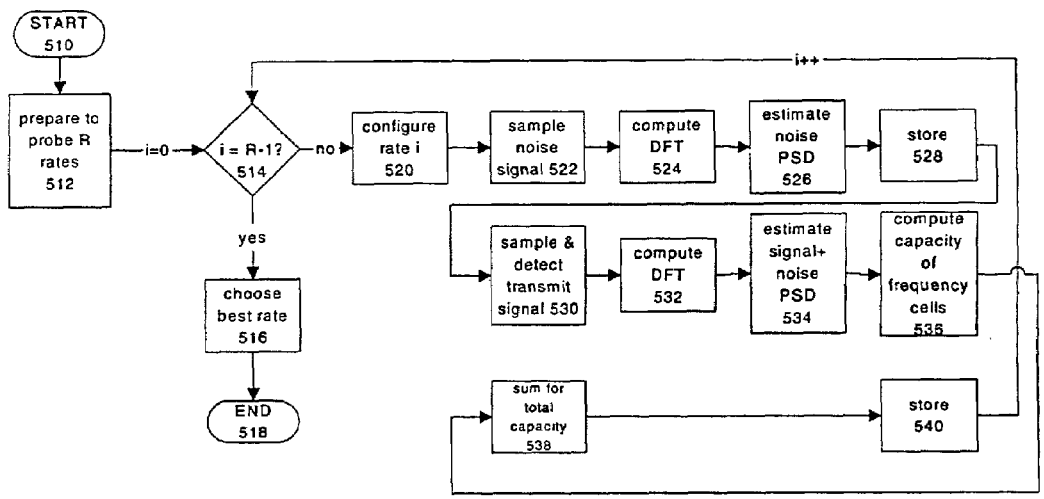
FIG. 5 is a flowchart illustrating a line probe session with a sub-band capacity calculation, according to an embodiment of a second aspect of the present invention.

According to an embodiment of the present invention, rate selection may be based on a sub-band SNR calculation. FIG. 5 illustrates a flowchart for a line probe session with a sub-band capacity calculation, according to an embodiment of the present invention. At step 510, a line probe session is initiated. Step 512 involves preparing to probe R rates and step 514 involves determining, such as through comparing or calculation, whether i=R−1, where i represents the index for the rate. If so, an optimal (or best) rate is chosen based on the results of the capacity calculations for each of the probed rates. For example, the highest rate with a capacity greater than the rate itself may be chosen, at step 516 and line probe session is terminated at step 518. If i does not equal R−1, rate i may be configured, at step 520. At step 522, a noise signal may be sampled. At step 524, a DFT may be computed for the noise signal. At step 526, noise PSD may be estimated for the noise signal. At step 528, relevant information, such as the noise power for each frequency sub-band is stored for later use in computing the overall capacity for the given rate, for example. At step 530, a transmit signal is sampled and detected and step 532 involves computing a DFT for the transmit signal. Step 534 involves estimating a signal and noise PSD. At step 536, capacity of frequency cells (e.g., sub-bands) may be computed. At step 538, summation of a plurality of frequency cells may be computed for a total capacity. At step 540, relevant information, such as the capacity calculated for the tested rate may be stored for use such as in determining the best rate after most or all rates have been probed. At step 514, it may determined whether i=R−1 where the variable i has been increased by a predetermined value (as shown by i++).

To compute the SNR based on frequency domain data, power spectrums of the signal and noise may be determined. This is shown in equations (29) and (30) below.

$$Y(k) = \frac{1}{N} \sum_{n=0}^{N-1} [s(n) + w(n)] \exp\left(\frac{-2 \cdot \pi \cdot j \cdot k \cdot n}{N}\right) = S(k) + W(k) \quad (31)$$

$$\hat{W}(k) = \frac{1}{N} \sum_{n=0}^{N-1} w(n) \exp\left(\frac{-2 \cdot \pi \cdot j \cdot k \cdot n}{N}\right) \quad (32)$$

Equations of (31) and (32) show N-point DFT's of the signal-plus-noise and noise, respectively. According to an embodiment of the present invention, transforms may be computed with the Fast Fourier Transform (FFT). The real 2N input sequence may be packed into an N point complex sequence as shown above. According to an embodiment of the present invention, transform weights may be computed recursively with two (or more) initialization variables using the method shown above. As mentioned previously, other methods may be implemented to estimate the power spectral density (PSD).

Starting with equation (30) above, an overall capacity may be determined by summing capacities for each individual sub-band as shown by equation (33) below.

$$C \cong B_s \sum_{k=\alpha}^{\beta} \log_2\left(1 + \frac{|Y(k) - \hat{W}(k)|^2}{|\hat{W}(k)|^2 10^{\frac{(\Gamma - G + \gamma + \delta)}{10}}}\right) \quad (33)$$

$$= B_s \sum_{k=\alpha}^{\beta} \log_2\left(\frac{|\hat{W}(k)|^2 10^{\frac{(\Gamma - G + \gamma + \delta)}{10}} + |Y(k) - \hat{W}(k)|^2}{|\hat{W}(k)|^2 10^{\frac{(\Gamma - G + \gamma + \delta)}{10}}}\right)$$

$$= B_s \left(\sum_{k=\alpha}^{\beta} \log_2\left(|\hat{W}(k)|^2 10^{\frac{(\Gamma - G + \gamma + \delta)}{10}} + |\hat{S}(k)|^2\right) - \sum_{k=\alpha}^{\beta} \log_2\left(|\hat{W}(k)|^2 10^{\frac{(\Gamma - G + \gamma + \delta)}{10}}\right)\right)$$

where $B_s = \frac{B}{(\beta - \alpha + 1)}$;

$0 < \alpha < \beta < N-1$; $B_s$ represents a sub-band width in Hz; $\hat{S}(k)$ represents an estimated "signal only" power; Γ represents a gap from a theoretical channel capacity for PAM signals, in dB; G represents a coding gain of a Trellis decoder in dB; γ represents a required margin in dB (e.g., G.SHDSL Annex B margin is approximately 6dB); δ represents an implementation loss in dB, α represents an index of a first sub-band and β represents an index of a last sub-band.

The method above provides a figure of merit with which may be used to compare different symbol rates tested during line probing. For example, a requirement could be that the capacity needs to be larger than the desired data rate.

Another embodiment of the present invention may be directed to optimizing the performance of non-DMT-based DSL by shaping the transmitted spectral density according to line conditions. The G.SHDSL and HDSL2 standards may specify the transmitted power to be less than a certain value at any given frequency. A plot of these values vs. frequency may be referred to as the "mask". Standards may also specify the total power to be within a certain range. Within these constraints, the shape of the transmitted power-spectral density (PSD) is left open to the designers. In general, the modem at one end of a communication connection, such as a pair of copper wires, may use a different transmitted PSD from the modem at the other end of the connection.

The present invention provides a method for choosing an optimal transmit PSD for a pair of modems given the line conditions (and/or other conditions). According to an embodiment of the present invention, line condition data may encompass power backoff values, as discussed in detail above. According to another embodiment of the present invention, line condition data may include data rate using sub-band capacity, as discussed in detail above. For example, line condition data may be based on an overall capacity wherein the overall capacity is determined by summing a geometric frequency domain approximation of channel capacity for a plurality of sub-bands, as discussed in detail above. Line condition data may further include a combination of power backoff values and data rate using sub-band capacity. Other forms of line condition data may be used by the present invention. The transmitted PSD may be chosen to minimize interference, such as echo and noise. Other forms of interference may also be minimized.

This aspect of the present invention is directed to methods for shaping the transmitted PSD to maximize the performance of a pair of modems (e.g., non-DMT-based modems). In general, a different transmitted PSD may be used for different line conditions and for different data rates. In addition, this aspect of the present invention encompasses how the line conditions may be measured at the start of modem training.

In the G.SHDSL and HDSL2 standards, the transmitted PSD may satisfy various constraints. For example, for any given frequency, the PSD may be less than a certain value where a plot of these maximum values vs. frequency is called a "mask". In another example, the total transmitted power may lie between a minimum and maximum value, where the maximum value is typically less than the power under the mask. These two constraints may leave some freedom to the designer to develop spectral shapes that yield an optimal performance for different line conditions.

The power requirement for the transmit PSD is shown in equations (34) and (35) below.

$$P_{min} \leq \int_{-\infty}^{\infty} |H(f)|^2 df \leq P_{max} < P_{mask} \quad (34)$$

$$|H(f)| \leq |M(f)| \quad (35)$$

where H(f) represents a transmit PSD; M(f) represents a mask PSD; $P_{min}$ represents a minimum allowed transmit power as specified in the standard; $P_{max}$ represents a maximum allowed transmit power as specified in the standard and $P_{max}$ represents an integral under the mask of PSD.

The transmitted PSD may be chosen to minimize interference. Interference may include echo and noise, for example. Other forms of interference may also be considered. For a given modem, echo may be the part of the transmitted signal which leaks into the receiver or reflects back from interfaces and bridge taps. While this echo may be partially cancelled, there are frequencies at which the echo may be difficult to cancel. Therefore, decreasing the transmitted power of the local modem at those frequencies may reduce the un-canceled echo.

For example, noise may include any unwanted signal from sources external to the modem. For any given frequency, the effects of noise may be reduced by increasing the received signal power. Received signal power may include the transmitted signal power of the remote modem after attenuation by the line connecting the two modems. Therefore, increasing the transmitted power of the remote modem at a particular frequency may reduce the effects of noise at that frequency on the local modem. This increase may be assumed to be within the constraints of the mask as shown in (34) above.

Therefore, the performance of a modem may be characterized by an associated signal-to-noise ratio (SNR), which may be defined as follows:

$$SNR = \frac{\int |T_f(f)H_c(f)|^2 df}{\int |E(f)|^2 df} = \frac{\int |T_f(f)H_c(f)|^2 df}{\int |R_e(f) + W(f)|^2 df} \quad (36)$$

where $R_e(f)$ and W(f) represent spectrums of independent random noise processes, and $T_f(f)H_c(f)$ are equal to a received spectrum as a function of frequency.

The SNR may depend on the transmitted PSD, the channel attenuation, the echo power and/or the noise power, as well as other factors. For longer loops, the channel attenuation may be greater. The present invention enables the SNR for both modems to be above a certain minimum SNR. This minimum SNR may correspond to a minimum acceptable bit-error rate (BER).

Due to various factors, variations in connection or line conditions may exist. Terms used to describe line conditions may include high noise, short loop and long loop, for example. High noise may include a case where the noise floor is at a level, over any loop, to cause an SNR value which is close to the minimum SNR. Short loop may include a case where the channel attenuation of the far transmitted signal is small enough that, in the absence of noise, the SNR is significantly above the minimum SNR. Long loop may include a case where the channel attenuation of the far transmitted signal is large enough that, in the absence of noise, the SNR is approximately equal to the minimum SNR.

Generally, modems tend not to perform well in the high-noise long-loop case. This means that a long-loop high-noise case is one in which the channel attenuation of the received signal as well as the receiver noise conditions are such that the signal-to-noise ratio (SNR) is not at a sufficient level to allow a bit error rate (BER) equal to or lower than the standard specification. Various possible scenarios exist as listed below where CO represents a "central office" modem and CPE represents a "customer premise equipment" modem.

1. CPE low noise & CO low noise, long loop: CPE and CO may both have small SNR values due to channel attenuation.
2. CPE low noise & CO high noise, short loop: CPE may have a large SNR margin due to low noise environment and low attenuation by the channel. CO may have a small SNR due to a high noise environment.
3. CPE high noise & CO low noise short loop: CPE may have a small SNR due to a high noise environment and the CO may have a large SNR due to low noise environment along with low attenuation by the channel.
4. CPE high noise & CO high noise, short loop: Both CO and CPE may have a high noise environment causing a low SNR. Channel attenuation may not be the limiting factor in this case.

Figure 6:
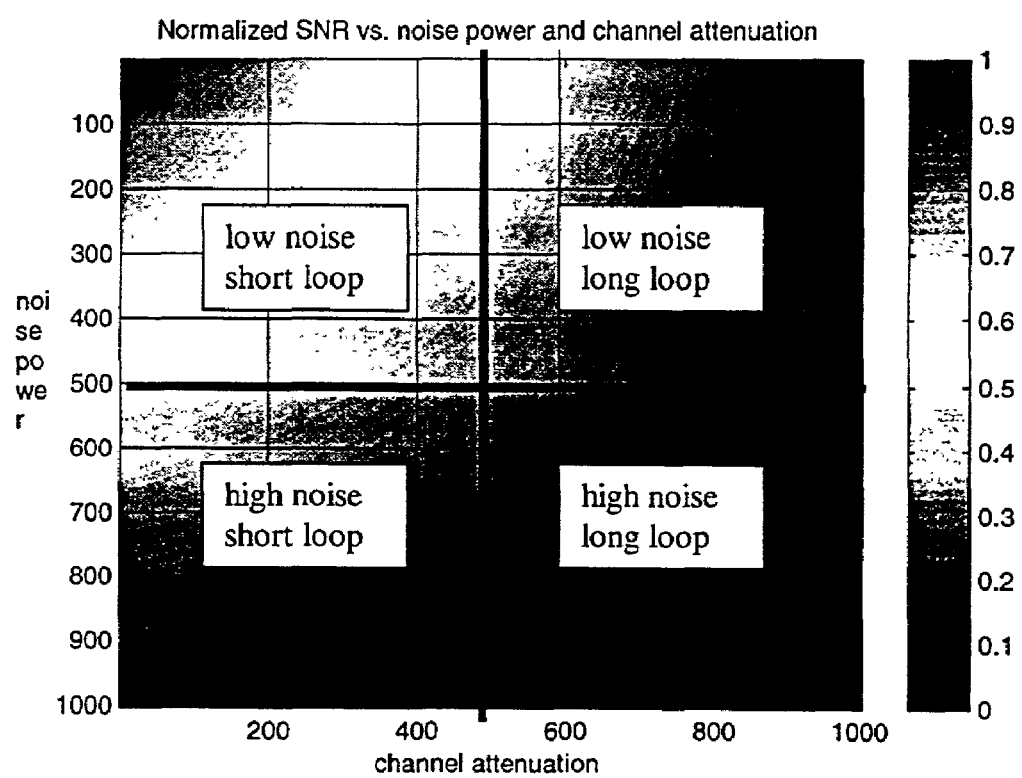
FIG. 6 is a plot representing normalized SNR vs. noise power and channel attenuation, according to an embodiment of a fifth aspect of the present invention.

One aspect of the present invention addresses methods to deal with each of these cases by choosing specific transmit filters based on the line conditions determined during pre-activation. The following abbreviations will be employed:
1. LNLL: low-noise long-loop
2. LNSL: low-noise short-loop
3. HNSL: high-noise short-loop An embodiment of the present invention provides a method for determining line conditions. FIG. 6 illustrates a contour plot of the SNR versus arbitrary units of (noise+echo) power and arbitrary units of channel attenuation wherein 0 corresponds to the bottom right corner and graduates to 1 which corresponds to the upper left corner. Given measurements of the SNR and noise power, this plot may be used to determine the line conditions. The straight lines separating the quadrants may be replaced with lines of any shape. Based on where the SNR and noise power level falls within the plot, the line conditions may then be determined. In a hypothetical example presented in the plot, performance in all but the "high noise, long loop" quadrant may be optimized using this embodiment of the present invention.

Figure 7:
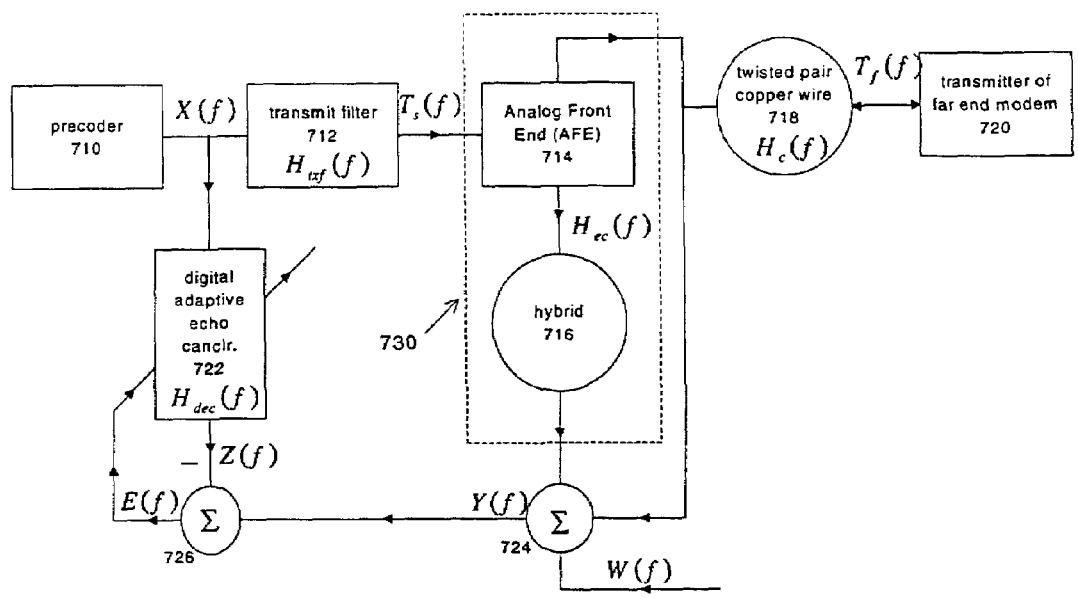
FIG. 7 is a block diagram of a G. SHDSL system, according to an embodiment of the fifth aspect of the present invention.

Another embodiment of the present invention relates to echo channel frequency response (e.g., echo spectrum). FIG. 7 is a block diagram of a G.SHDSL system's transmit and receive paths, according to an embodiment of the present invention. The dotted box encloses an echo channel 730. The echo channel 730 may not have a flat frequency response and may tend to pass low frequencies with less attenuation than higher frequencies. These low frequencies may contribute partially or significantly to the length (e.g., temporal) of the echo and in turn the ability of the fixed length (e.g., in time) digital echo canceller that may cancel the echo.

A precoder output from precoder 710 may be an input into transmit filter 712, as well as digital adaptive echo canceller 722. A transmit spectrum of the near modem may be an output of transmit filter 712, which may then be an input to analog front end 714. Analog front end 714 may transmit a time varying frequency response of a digital adaptive echo canceller to hybrid circuit 716. Analog front end 714 may also be coupled to twisted pair of copper wire 718 which is communicative with a transmitter of far end modem 720. An output of analog front end 714, an output of hybrid 716 and a composite spectrum of channel, receiver, crosstalk and quantization noises may be inputs to summer 724. The output of summer 724 may be an input to summer 726, where the output of summer 724 may be summed with an output of digital adaptive echo canceller 722. The output of summer 726 may include an error of adaptive echo cancellation algorithm.

As for echo, in the G.SHDSL and HDSL2 standards, both modems may share the same twisted pair of copper wire 718. This means that the transmit signal may leak through the echo channel into the receive path. The echo may be defined as the convolution of the transmitted signal with the echo channel.

An echo channel 730 may include analog hardware that the transmitted signal passes through before it is seen in the receive path. The echo channel 730 may include an analog front end 714 and a hybrid 716. The hybrid 716 may act as an analog echo canceller to remove at least a portion of the echo.

Residual echo may include the echo that remains after analog and digital adaptive echo cancellation. In some cases, it may not be possible or practical to cancel some or all the echo. Thus, it is desirable to make the residual echo as small as possible.

According to an embodiment of the present invention, the signals in FIG. 7 are defined as follows:

X(f)=precoder output
$H_{txf}(f)$=frequency response of transmit filter
$T_s(f)$=transmit spectrum of the near modem
$T_f(f)$=transmit spectrum of the far modem
$H_c(f)$=frequency response of the channel
$H_{dec}(f)$=time varying frequency response of digital adaptive echo canceller
$H_{ec}(f)$=frequency response of the echo channel
E(f)=error of adaptive echo cancellation algorithm
W(f)=composite spectrum of channel, receiver, crosstalk and quantization noises As shown in FIG. 7, an output of the precoder 710 may have an approximately flat power spectrum. Keeping this in mind while tracing the signal paths in the above block diagram, the following may apply:

$$X(f) \cong K = \text{constant} \tag{37}$$

$$Y(f) = X(f)H_{txf}(f)H_{ec}(f) + T_f(f)H_c(f) + W(f) \tag{38}$$

$$Z(f) = X(f)H_{dec}(f) \tag{39}$$

$$\begin{aligned}E(f) &= Y(f) - Z(f) \\ &= [H_{txf}(f)H_{ec}(f) - H_{dec}(f)]X(f) + T_f(f)H_c(f) + W(f) \\ &= [H_{txf}(f)H_{ec}(f) - H_{dec}(f)]K + T_f(f)H_c(f) + W(f)\end{aligned} \tag{40}$$

where $R_e(f)$ is defined as $[H_{txf}(f)H_{ec}(f)-H_{dec}(f)]K$ wherein $R_e(f)$ represents residual echo spectrum, then $E(f)=R_e(f)+T_f(f)H_c(f)+W(f)$.

Looking at equations (37) through (40), the signal at the output of the summer 726 (E(f)) may include the received signal plus residual echo plus the total noise power (e.g., crosstalk+quantization noise+channel noise+receiver noise). During the initial training of the echo canceller, the received signal may not be present. As a result, the output of the summer 726 may become as follows in equation (41).

$$E(f)=R_e(f)+W(f) \tag{41}$$

FIGS. 8, 9, 10 and 11 illustrate examples of the echo channel response for two different G.SHDSL data rates: 2304 kbps and 192 kbps. In this example, the simulation may assume the modem is attached to 15kft of 26-AWG (American Wire Gauge) wire.

Figures 8, 9:
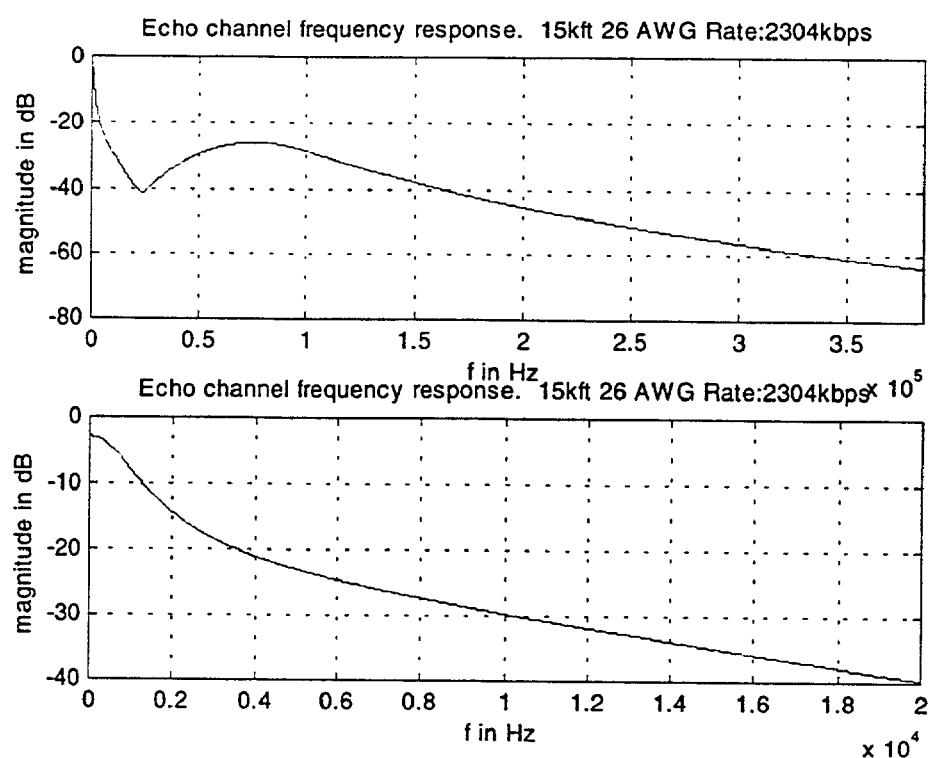
FIGS. 8–11 are charts illustrating echo channel frequency responses, according to an embodiment of the fifth aspect of the present invention.
Figures 10, 11:
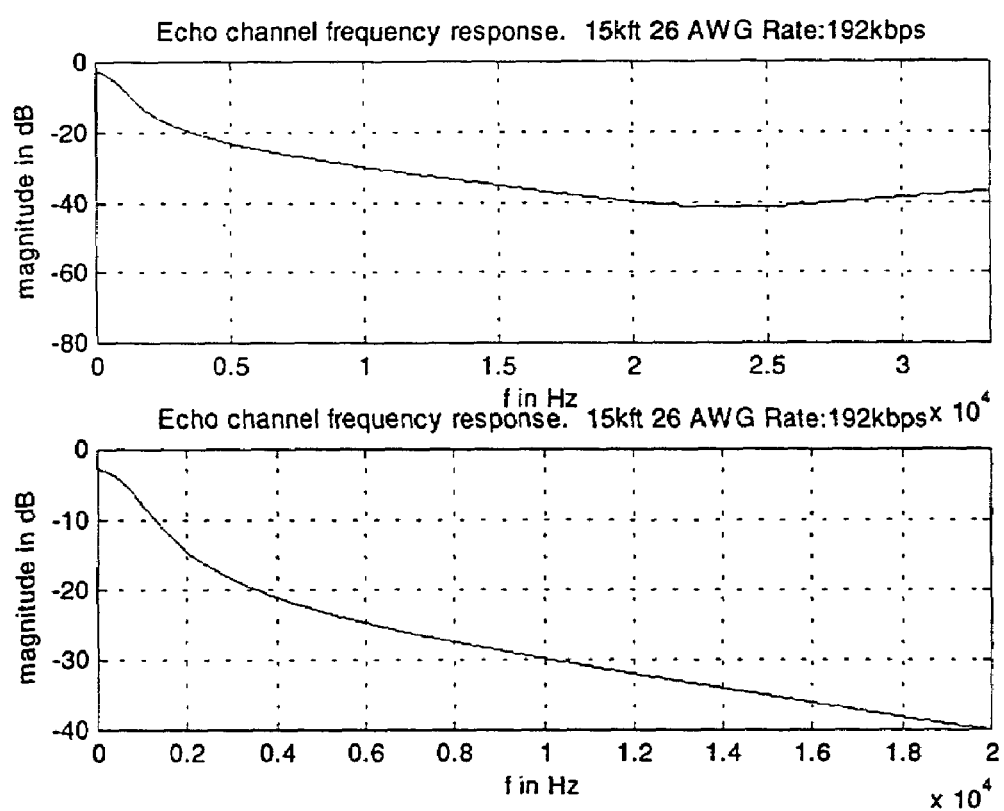

As shown in FIGS. 8, 9, 10 and 11, a large fraction of the echo power may reside in lower frequencies, because of reduced attenuation. As shown in FIG. 9 and FIG. 11, which are zoomed versions of FIG. 8 and FIG. 10 at frequencies 0 to 20 kHz, considerably less power is attenuated at the frequencies below 20 kHz. The residual echo spectrum is the echo channel frequency response multiplied by a transmit filter spectrum of $T_s(f)H_{ec}(f)$ shown in FIG. 7 above. It is thus desirable to minimize residual echo power at the output of the summer (e.g., 726), such as $R_e(f)$ in equation (41), as much as possible, as described in further detail below.

Another aspect of an embodiment of the present invention involves improved performance on long loops. In the case where both the CO and CPE have a LNLL scenario, the performance of the system may be considered echo limited. With a long loop, the received signal may be greatly attenuated and may be considered small relative to the residual echo. The analog hybrid may provide some echo cancellation and the digital echo canceller may cancel the echo to a power level below that of the received signal. The resulting residual echo at the output of the summer 726 in FIG. 7 (E(f)) may effectively become the noise floor of the receiver. By shaping the transmit power spectrum such that the low frequencies are not transmitted at a significant power level, the residual echo power may be reduced and therefore the reach may be extended. Reach may relate to the maximum length of twisted pair wire over which the modems can maintain the minimum SNR. This may be contrary to the conventional wisdom that the transmitted PSD should not be reduced in the low-frequency regions where the channel attenuation is less than in the high-frequency regions.

As a result, if both modems transmit less power in low frequencies, the SNR may effectively improve. This may be considered counterintuitive in some applications since the local modem is reducing its noise floor by transmitting less energy in the lower frequencies, but at the same time the remote modem is also transmitting less power at those frequencies. A reason for SNR improvement may be attributed to nonlinearities in the analog portion of the echo channel. The nonlinear echo channel may produce noise at frequencies other than the transmitted frequency. That is, if a tone is transmitted through the echo channel at a particular power level, it may generate harmonics at higher frequencies. When the amplitude of the transmitted sinusoid is reduced, the power of the harmonics may reduce nonlinearly. The nonlinear effects occur more severely at the lowest frequencies, which makes it more detrimental to lower data rates.

Figure 12:
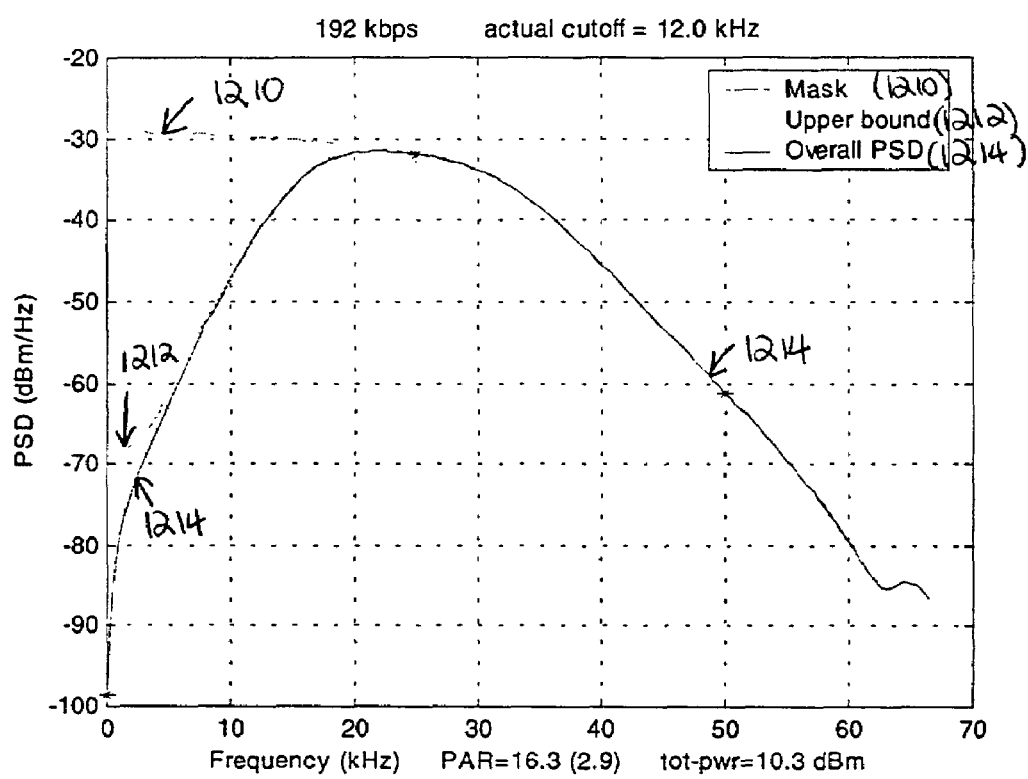
FIG. 12 is a chart illustrating transmit PSD that reduces nonlinear effects at lower frequencies, according to an embodiment of the fifth aspect of the present invention.

An example of this is shown in the FIG. 12. FIG. 12 illustrates a transmit PSD that reduces nonlinear effects at lower frequencies, according to an embodiment of the present invention. Comparing an overall PSD 1214 to a mask 1210, the transmitted power at lower frequencies may be significantly less. An upper bound may be illustrated by 1212. However, at the rate shown, the lower powered filter may actually perform at a higher SNR because the noise floor at some or all frequencies has been lowered by reducing the transmitted power at lower frequencies. There is an optimum low-frequency cutoff for each rate, which may be determined empirically, for example. In this example, peak-to-average ratio (PAR) equals 16.3 (2.9), total power is 10.3 dbm where an actual cutoff is at 12.0 khz.

Reducing the transmitted power in low frequencies may result in an increase in the maximum attainable line length over that obtainable with filters that may be optimized for noise performance.

Another aspect of this embodiment of the present invention involves improved performance on mixed cases. For the case where one side, either the CPE or CO, experiences a LNSL environment and the opposite side experiences a HNSL environment, the noise limited side may experience an improvement in performance by shaping the filters on both sides differently.

In the case where one side experiences a low noise environment and the other is in a high noise environment, as determined from comparing test results to some threshold value, the modems may exchange information that lets the other side know what type of environment it sees. Each side may then shape a transmit spectrum to benefit both itself and the far modem.

Figure 13:
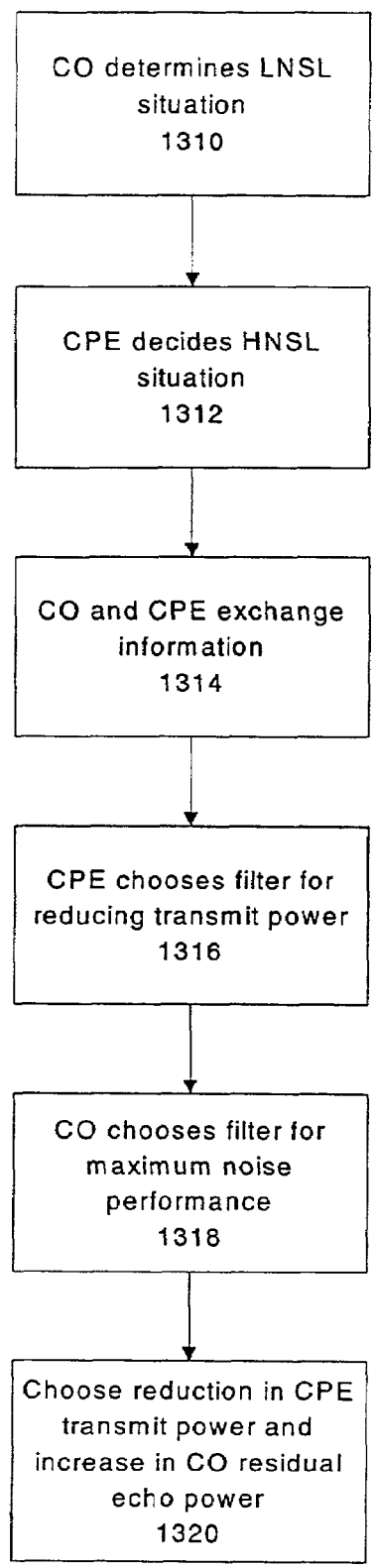
FIG. 13 is a flowchart illustrating a filter selection method, according to an embodiment of the fifth aspect of the present invention.

FIG. 13 is an example of a flowchart for selecting a filter, according to an embodiment of the present invention. At step 1310, a CO side may determine it is in a LNSL situation using a proprietary line probe session. At step 1312, a CPE may determine it is in a HNSL situation using a proprietary line probe session. At step 1314, both sides may exchange information to indicate what type of environment it sees. At step 1316, the CPE may choose a filter that reduces transmit power in the low frequencies thereby lowering echo power, and in turn lowering its overall noise floor (due to nonlinearities in the echo channel). It may do this because it knows the CO is in a low-noise environment with a certain level of margin and may tolerate a reduction in the CPE's transmit power. In addition, the CPE may lower its overall transmit power across some or all frequencies using power back off (PBO) either alone or in addition to the high pass filtering.

At step 1318, the CO may choose a filter that may be designed for maximum noise performance on the far end. It may tolerate an increase in its echo level because it is in a non-echo-limited case, wherein lower frequencies may not be filtered. This may increase the received power at these frequencies on the far end, thereby improving the CPE (which may be noise limited) SNR. At step 1320, the reduction in the CPE transmit power and the increase in the CO residual echo power may be chosen judiciously so as not to decrease the CO's margin to an unacceptable level.

An end result of this filter selection method is to give a customer or other user extra noise margin, which may be defined as the amount of noise that may be added after the modems go to steady-state while maintaining an SNR above the minimum SNR.

Figure 14:
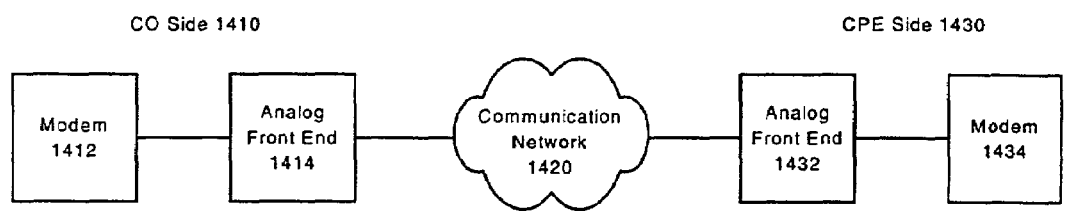
FIG. 14 is a system diagram of a communication network, according to an embodiment of the present invention.

FIG. 14 is a system diagram of a communication network, according to an embodiment of the present invention. A communication network may involve, at least, a CO side structure 1410 in communication with a CPE side structure 1430 via a communication network 1420. In particular, CO side 1410 may include modem 1412 in communication with an Analog Front End 1414. CPE side 1430 may include Analog Front End 1432 in communication with modem 1434. The system described in FIG. 14 may incorporate various inventive aspects of the present invention.

Another aspect of this embodiment of the present invention involves improved performance on noise limited cases. The present invention may also address cases where both sides experience a HNSL environment by using transmitted PSDs that may be optimized for noise. This may be in contrast to using a transmitted PSD that is a compromise between one that is optimized for noise and one that is optimized for reach.

Another aspect of this embodiment of the present invention involves minimizing the number of required transmitted PSDs. A transmitted PSD may be stored as a set of transmit-filter coefficients. Therefore, increasing the number of transmitted PSDs may require more storage for these coefficients. Various factors may increase a desired number of transmitted PSDs. For example, for a given data rate, there may be an infinite number of transmitted PSDs where each one may be tailored to specific line conditions.

According to another embodiment of the present invention, the number of transmitted PSDs may be limited to at least two where one may be optimized for noise performance and one may be optimized for reach performance. For line conditions which may be a mixture of noise and reach, an interpolation between the two may be implemented. In general, N PSDs may exist where interpolation among these N PSDs may occur.

In general, there may be a different set of transmitted PSD's for each data rate. This is because certain factors may be different for each data rate. Such factors may include one or more of residual-echo spectrum, the noise spectrum, and the transmitted-PSD mask.

It may be desirable to reduce the number of transmit filters stored. A way to accomplish the reduction may include designing a smaller subset of filters that have normalized parameters. For example, if a good LNLL filter for data rate 2304 kbps has a cutoff of 30 kHz and a good LNLL filter for 768 kbps has a cutoff of 10 kHz, the same (similar or related) filter may be used for both rates. A digital filter may be designed to have a cutoff of 0.03866*Fs/2, for example, and that may give approximately the desired cutoff at both rates. In addition, a noise filter may be designed at a low rate with a small cutoff, which may then be used at a higher rate as a LNLL filter with a higher cutoff.

Another embodiment of the present invention may be directed to varying G.SHDSL echo canceller filter lengths based on data rate. As outlined in the G.SHDSL standard, modems may be required to support data rates between 64 kbps and 2312 kbps in 8 kbps increments, for example. Other requirements or recommendations may be implemented. When using a fixed length digital adaptive echo canceller filter to model an echo channel, a large number of filter taps may go unused depending on the data rate and/or other factors. This may occur specifically when the data rate is decreased because the time spacing between successive samples increases. In other words, the echo may use a fewer number of filter taps before it decays to a negligible value.

An aspect of the present invention provides a method and system for choosing a reduced length filter based on data rate. A polynomial may be fit to a curve where the curve represents an approximate echo channel length for a complete (or other defined) range of data rates. When a data rate is chosen by a G.SHDSL modem, an echo canceller filter length may be chosen accordingly. This allows for reduced CPU cycles for performing an adaptive algorithm. Since training time is constrained to a fixed time duration, this allows for a longer period of training time at lower rates, thereby reaching a lower mean squared error (MSE) than if a full length filter were implemented.

G.SHDSL modems may transmit full duplex over a single twisted pair of copper wire. Both upstream and downstream signals may share the same (or similar) frequency bandwidth. For a given modem, a transmit signal may be removed from a receive signal with an echo canceller. The echo cancellation function may be implemented twice, once in the analog domain and once in the digital domain. An embodiment of the present invention is directed towards the digital echo canceller. The impulse response of the echo channel may be infinite. A digital adaptive filter that attempts to identify this channel may have a finite length. Because some designs rely on a fixed length echo canceller filter where the number of taps may be chosen conservatively based on experimental data to model the echo channel, perhaps for a worse case situation, there may be many unused taps for certain configurations.

Typically, digital echo canceller coefficients may train to a noise floor. The noise floor is close to a quantization noise floor. For many cases, a large number of taps towards the end of the filter may have small values (e.g., close to one least significant bit (LSB) or other cutoff value, such as several LSBs) and be assumed to have little impact on the MSE. The point when the echo canceller coefficients decay to these small values (or other predetermined values), if they do, is variable and may depend on various conditions, such as one or more of data rate, transmit filter design, analog circuitry such as hybrid and line transformer, line conditions such as the placement of bridge taps, and/or other conditions. The length of an echo tail (e.g., the tail of the echo channel impulse response and the number of coefficients used) may depend on one or more of the above conditions.

Another phenomena occurs when there is a fixed delay in time of the echo through the analog circuitry. This may cause a section of taps at the beginning of the filter to take on small values close to a quantization noise floor. In this case, it may be desirable to have a programmable hardware delay that adjusts for this analog delay. Since the delay time may be fixed, a number of digital echo canceller taps that may be implemented to adjust for the delay time may vary with data rate. Similarly, the programmable delay may vary. Typically, the number of taps that may be removed from the tail may be much larger than those that may be removed from the start of the filter, for example.

For higher data rates, a transmit filter may be designed to transmit less energy at lower frequencies and more power at higher frequencies, within the constraints of the standard, such that the echo tail is shorter. This may allow for the use of a shorter echo canceller filter, thereby saving hardware capacity as well as operating power.

If the echo canceller filter is designed in hardware, further savings in power consumption may be made at some or all rates. The hardware may be designed such that banks of filter coefficients may be shut off when they are not being used, thereby reducing overall power consumed by the processor since no or minimal multiplications (or other operations or calculations) may be performed on those coefficients.

Figure 15:
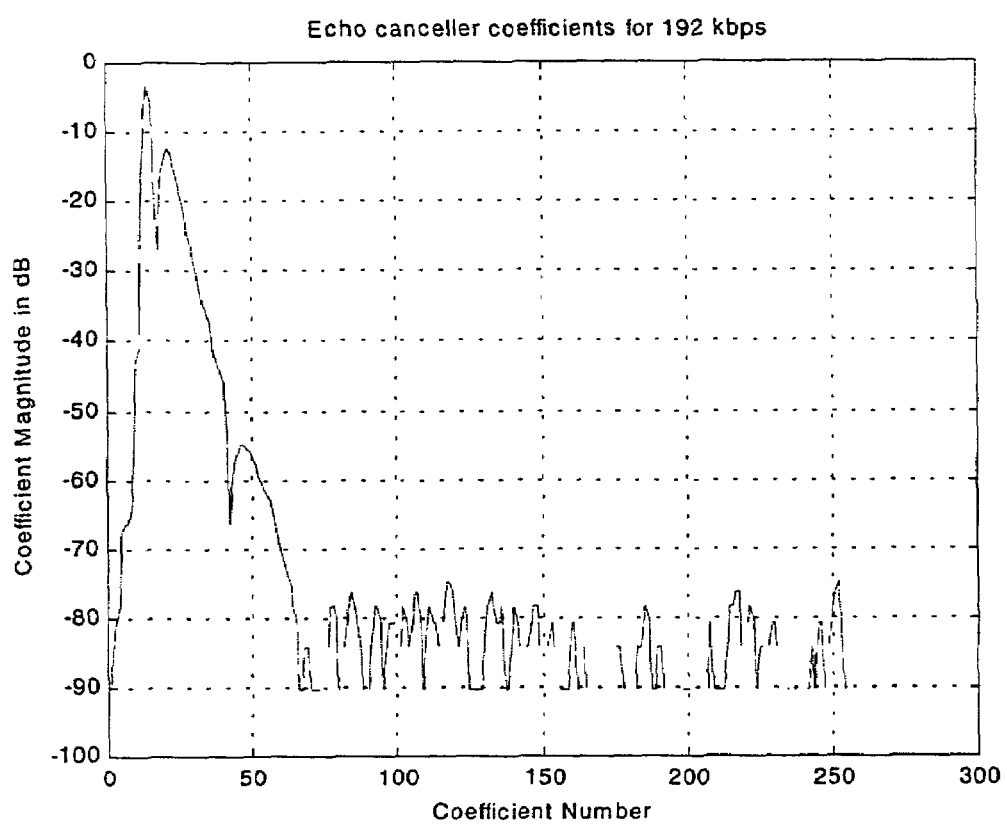
FIG. 15 is a chart illustrating echo canceller filter taps, according to an embodiment of a third aspect of the present invention.
Figure 16:
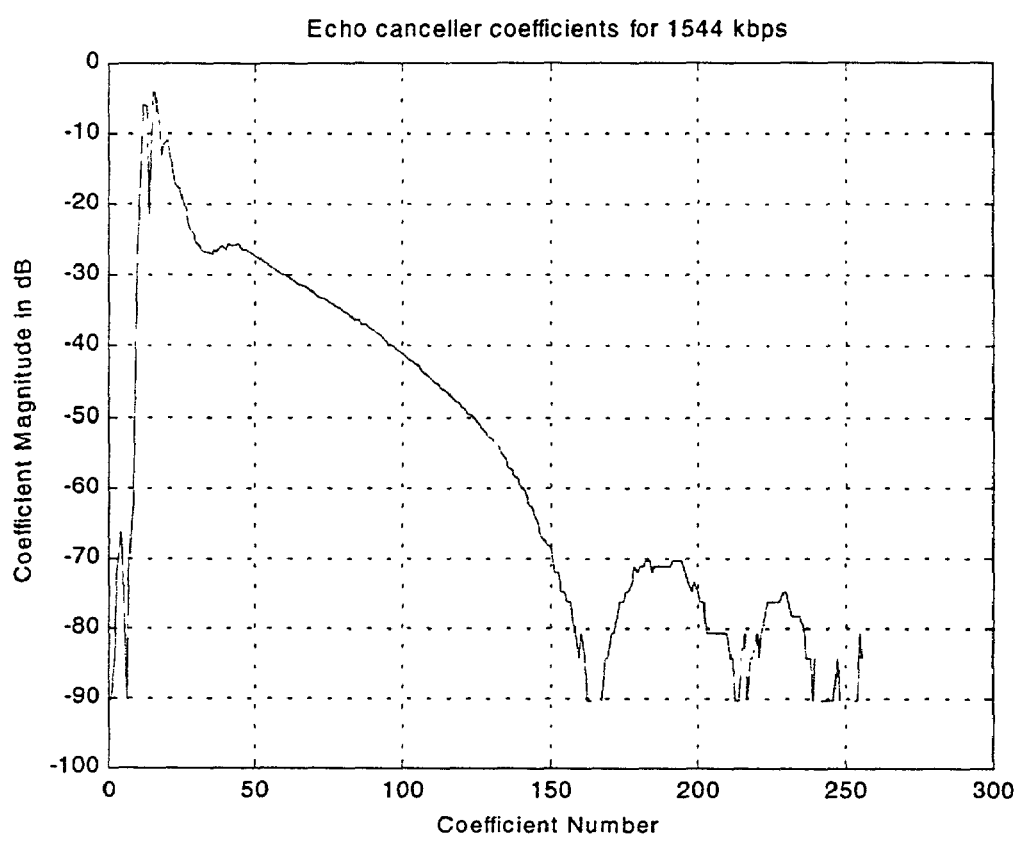
FIG. 16 is a chart illustrating echo canceller filter taps, according to an embodiment of the third aspect of the present invention.

FIGS. 15 and 16 illustrate low and high rate echo channel impulse responses for a digital echo canceller, according to an embodiment of the present invention.

FIG. 15 is a chart illustrating echo canceller filter taps for a specified rate, according to an embodiment of the present invention. More specifically, FIG. 15 illustrates echo canceller filter taps for the rate 192 kbps. Coefficient magnitude in dB is illustrated with respect to coefficient number or filter taps. In this example, digital echo canceller coefficients may be at 192 kbps with 5500 m PE04 twisted pair channel. As can be seen on the plot, beyond approximately tap 75, the filter coefficients may be small enough to be discarded as these coefficients approach the 16-bit noise floor, of approximately −90.31 dB.

In another example, digital echo canceller coefficients may be at 1544 kbps with 4000 m PE04 twisted pair channel. FIG. 16 is a chart illustrating echo canceller filter taps for 1544 kbps. It can be seen from the plot that the entire filter length may be considered to accurately model the echo channel.

Figure 17:
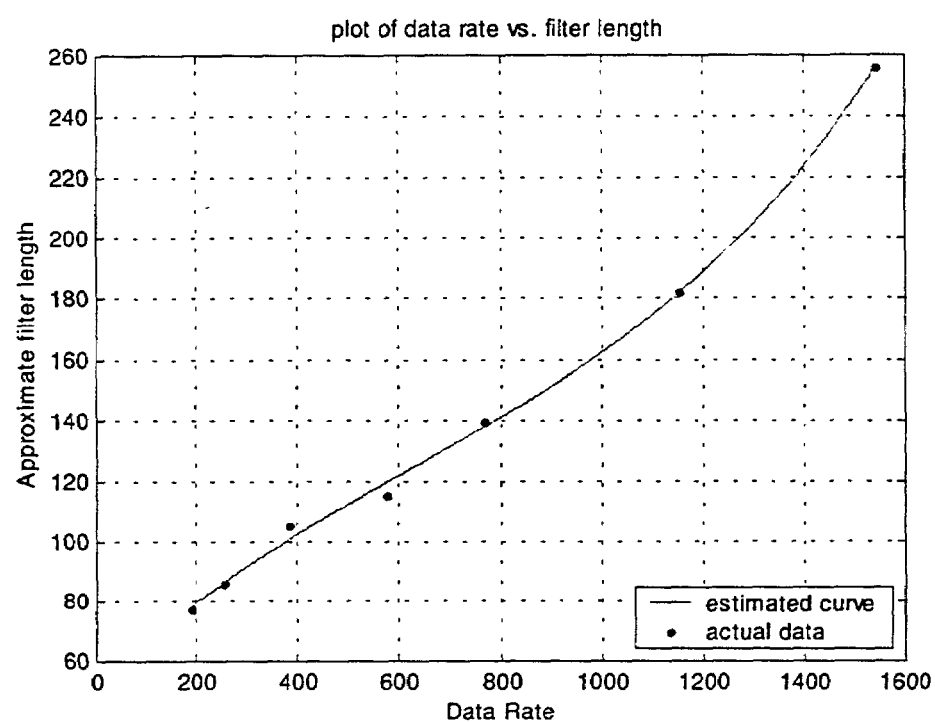
FIG. 17 is a chart illustrating a polynomial curve used to approximate echo channel length, according to an embodiment of the third aspect of the present invention.
Figure 18:
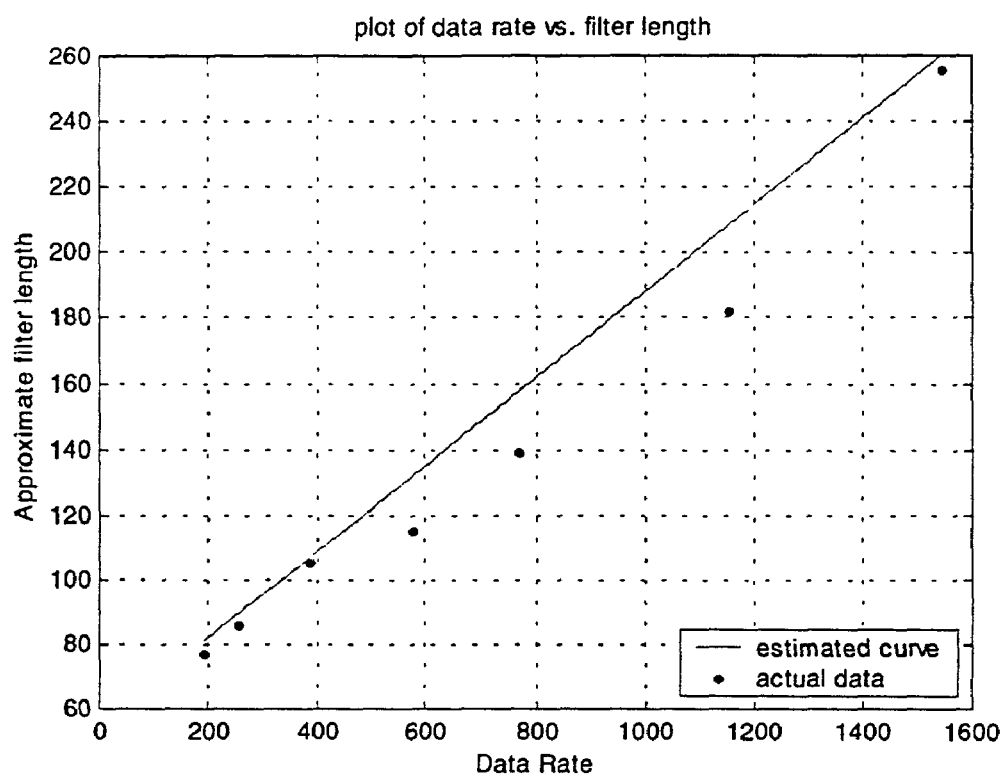
FIG. 18 is a chart illustrating a linear curve used to approximate echo channel length, according to an embodiment of the third aspect of the present invention.

FIGS. 17 and 18 illustrate various ways to adjust the number of digital echo canceller filter taps based on data rate, according to further embodiments of the present invention.

As shown in FIG. 17, an approximate echo channel length may be measured at various data rates. A polynomial may then be fit to the resulting curve. When a data rate is chosen, the rate may be an input to the polynomial function and the output may be the approximate number of filter taps that may be used to model the channel for the given rate. This may be used during an EC training stage to determine the number of taps that may be implemented for the configured data rate.

As shown in FIG. 18, another method may involve plotting an echo channel length at a select number of frequencies versus data rate. A linear curve may be drawn above some or all the points. This provides a simple linear scaling of the filter.

Another method for choosing the echo canceller length may involve performing an analysis of the echo canceller coefficients after the training session that takes place during the optional line probe session, as described. The echo canceller may be trained to determine the spectrum of the residual echo, which becomes the noise floor of the system. This information is then used to determine rate and power back off as well as spectral shaping. The echo canceller is trained again at a later time, for a larger number of training symbols, but the coefficients generated during the abbreviated training session that takes place during line probe may be used to determine more exactly the optimum length echo canceller for that particular modem.

A simple way of determining which point to truncate the echo canceller filter may involve a mean filter. This is illustrated in the equation (42) below.

$$y_k = \frac{1}{10}\sum_{i=o}^{9} w_{k-i} \quad k = 0, 1 \cdots M - 1 \quad (42)$$

where M represents a maximum length in taps of an echo canceller filter and w represents the filter coefficients.

The output of this filter may be observed, and when it drops below a predetermined threshold T, the remaining taps are assumed to be unnecessary. The threshold may be chosen to correspond to a particular dB value. For example, if the filter coefficient is a 16-bit fixed-point quantity and a coefficient $\geq 80$ dB below the peak is considered irrelevant, the following may be used to determine the threshold.

$$20\log_{10}\left(\frac{T}{2^{15}}\right) = -80 \quad (43)$$

$$\text{where } T = 2^{15} 10^{\frac{-80}{20}} = 3.2768$$

The output of the mean filter is compared to the threshold and when it is consistently below the threshold, those taps may be ignored. In another example, if a processor uses 24 bit precision, $2^{23}$ may be used, instead of $2^{15}$ in the above equation (43). In this example, since a quantization noise floor is approximately 138 dB, a cutoff point of approximately 120 dB may be selected. The cutoff point is a point at which a coefficient is determined to have a minimal effect on the filter output.

There are various advantages to this method of the present invention. First, it may not require an experimental determination of the filter length curve as shown in FIG. 17, for example. Second, the worst case need not be chosen all the time. The filter length may be chosen based on the line conditions, which may be different for each modem.

The following factors may be considered when determining a maximum echo canceller filter length for a particular one or more rates. These factors may be considered on a subset of the total possible rates such that sufficient information may be available to estimate the curves in the figures mentioned above.

For example, a transmit signal may experience a delay as the signal leaks through to a receive path. As a result, the number of taps that may be used to model this delay may vary based on rate because the time spacing between successive samples may be inversely proportional to the rate. It may be desirable to compensate for this delay and for the delay offset to vary with rate. By ensuring the first several taps of the filter are used, taps from the filter tail may be removed. In the case of higher rates (e.g., where the echo tail may occupy some or all of the available taps), the usage of the available taps may be improved to increase performance.

Another factor may involve measuring an echo response for a case where the noise floor is very close to a quantization noise floor. This allows for a more accurate determination of where the filter taps decay to small enough values to discard. For cases where the noise floor is higher, the system may not be echo limited anyway. As a result, the reduced number of taps will not harm performance.

Another factor may involve measuring the echo response for assumed worse case bridge tap conditions. After the factors above have been investigated for a given rate, the number of taps used in the echo canceller filter may be determined for that rate.

The following discussion describes a block-adaptive LMS echo cancellation algorithm and various implementations thereof. One purpose of an echo canceller may include removing an image of a transmit signal that leaks through a hybrid and mixes with a received signal. This may occur because the transmit and receive signals share the same twisted pair transmission line. The echo canceller may include a hardware module that performs an adaptive weight update and filters the transmit signal to generate an echo model which may then be subtracted from the received signal. Routines, modules, instructions, etc. may be employed to select or generate certain parameters that effect system performance.

Figure 19:
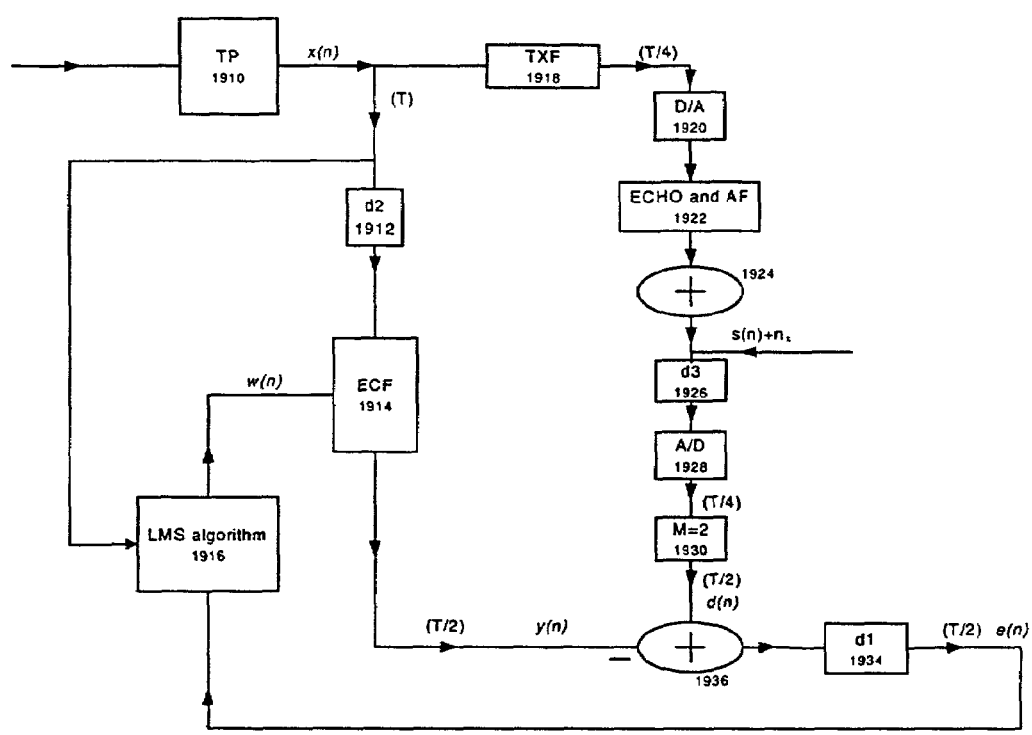
FIG. 19 is a block diagram illustrating basic operations of an echo canceller, according to an embodiment of the third aspect of the present invention.

FIG. 19 is a block diagram illustrating basic operations of an echo canceller, according to an embodiment of the present invention. A transmit signal may have an effective sampling rate increase by a factor of two, for example, enabling the echo canceller filter to also act as an interpolating filter.

Tomlinson Precoder (TP) 1910 generates signal x(n), where at least a portion of signal x(n) is received by transmit filter (TXF) 1918. Other types of precoders and/or filters may be implemented. The output of TP 1910 is further coupled to delay d2 1912 and LMS algorithm 1916, wherein x(n) may represent a T-spaced output of a Tomlinson precoder wherein T represents the reciprocal of the symbol rate. Filter 1918 outputs a signal (e.g., a T/4-spaced output), which may be received by digital-to-analog converter 1920. An analog version of the signal may be received by echo canceller and analog front end block 1922. Subtractor 1924 subtracts an estimate of the echo from the receive signal. Signal $s(n)+n_x$, which represents the receive signal plus channel noise, may be received by delay d3 1926, which may be further coupled to analog-to-digital converter 1928. A resulting signal T/4 may be received by block 1930, where decimation M is defined as 2, or other predetermined value. The resulting signal d(n) (e.g., a T/2 spaced output) may be subtracted from signal y(n) (e.g., a T/2 spaced output) by summer 1936 and inputted to delay d1 1934 for generating signal e(n) (e.g., a T/2 spaced output). The error signal e(n) may be received by LMS algorithm 1916 for generating signal w(n), which may be received by echo canceller filter 1914. Echo canceller filter 1914 is coupled to delay d2 1912 at an input and generates signal y(n).

A block-adaptive LMS algorithm 1916 periodically updates a weight vector. The echo canceller may be fractionally spaced, where the sample rate at an output is different than at an input. In a particular implementation, the echo canceller may implement an interpolation rate of 2, for example. Other interpolation rates may be implemented. The weight vector may contain a set of coefficients of a Finite Impulse Response (FIR) filter, which may be implemented in hardware. A software algorithm may write the updated coefficients to a memory that may be read by a hardware-based filtering block.

Another example may involve a fractionally spaced block LMS adaptive filter. An entire block LMS algorithm may be implemented in software where the algorithm may be fractionally spaced. Gear shifting may also be used to optimize the convergence/Minimum Mean Squared Error (MMSE) tradeoff, as further described below. A gear may be a particular value of the step size µ, shown in equation (44) below. An example of a weight update equation for the standard LMS algorithm is shown in equation (44) below $$w(n+1)=w(n)+\mu[e(n)x(n)] \quad (44)$$

where the error signal is given by equation (46) as seen in FIG. 19.

$$e(n)=d(n)-w^T(n)x(n) \quad (45)$$

where
d(n) is the desired response at time index 'n';
w(n) is the weight vector at time index 'n';
x(n) is the input vector at time index 'n'; and
e(n) is the error at time index 'n'.
and $$E(\omega) = D(\omega) - W(\omega)X(\omega) \quad (46)$$
$$= H(\omega)X(\omega) + S(\omega) + N_x(\omega) - W(\omega)X(\omega)$$
$$= [H(\omega) - W(\omega)]X(\omega) + S(\omega) + N_x(\omega)$$

where
$E(\omega)$ is the spectrum of the error;
$D(\omega)$ is the spectrum of the desired response;
$W(\omega)$ is the frequency response of the adapted filter;
$X(\omega)$ is the spectrum of the input signal;
$S(\omega)$ is the spectrum of the received signal; and
$N_x(\omega)$ is the spectrum of the noise.

As shown in equation (46), $H(\omega)$ may represent the frequency response of the echo-channel (e.g., composite transmit filter, echo channel and analog circuitry). Equation (46) shows that as the frequency response of the adapted filter coefficients represented by $W(\omega)$ more closely matches the frequency response of the echo-channel, the error signal may be dominated by the received signal plus some, $N_x(\omega)$.

Since the update of the weights in hardware may be accomplished while the hardware block is operating in real time, the weights may be updated periodically by averaging a weight vector over N blocks and then writing the averaged weight vector to hardware. This means for every N weight vectors that are updated by the software algorithm, one weight vector may be written to hardware. The averaging of the weight vector may be shown in equation (47) below.

$$w(n+1)=w(n)+\mu[e(n)x(n)]$$
$$w(n+2)=w(n+1)+\mu[e(n+1)x(n+1)]$$
$$w(n+N)=w(n+N-1)+\mu[e(n+N-1)x(n+N-1)] \quad (47)$$

By substituting the first line of (47) in the second, and the second into the third and so on, (47) becomes equivalent to equations (48) through (52) shown below.

$$w(n+N) = w(n) + \mu \sum_{i=0}^{N-1} [e(n+i)x(n+i)] \quad (48)$$

or more compactly $$w(n+N)=w(n)+\mu[X(n)e(n)] \quad (49)$$

where $$X(n)=[x(n)x(n+1)\ldots x(n+N-1)] \quad (50)$$

$$e(n) = \begin{bmatrix} e(n) \\ e(n+1) \\ \vdots \\ e(n+N-1) \end{bmatrix} \quad (51)$$

$$x(n) = \begin{bmatrix} x(n) \\ x(n-1) \\ \vdots \\ x(n-N+1) \end{bmatrix} \quad (52)$$

The above equations (48) through (52) may be referred to as the block-LMS algorithm, as illustrated by 1916 in FIG. 19, where the addition of the gradient estimate may be saved to the weight vector at each iteration. Instead, the weight vector may be updated at every N iterations, for example. The error signal in equation (47) and equations (48) through (52) is no longer the same as (44) since the weight vector is not updated at every sample. The N samples of the error signal may come from the weight vector at time index n.

Since the algorithm may also be fractionally spaced with an interpolation by 2, for example, the delays shown in block diagram FIG. 19 may be incorporated. As a result, equations (48) through (52) may be modified slightly as shown in equations (53) through (58) below.

$$w(n+N) = w(n) + \mu(n)\sum_{i=0}^{N-1} [e(n+i)x(n+i)] \quad (48)$$

becomes $$w^{even}(n+N) = 2^{-i}\left(w^{even}(n) + \mu(n)\sum_{i=0}^{N-1} [e(2(i+d_2)+d_1+n)x(n+i)]\right) \quad (53)$$

$$w^{odd}(n+N) = \quad (54)$$
$$2^{-i}\left(w^{odd}(n) + \mu(n)\sum_{i=0}^{N-1} [e(2(i+d_2)+d_1+n+1)x(n+i)]\right)$$

$$x(n) = \begin{bmatrix} x(n) \\ x(n-1) \\ \vdots \\ x(n-127) \end{bmatrix} \quad (55)$$

$$w(n) = \begin{bmatrix} w_0(n) \\ w_1(n) \\ \vdots \\ w_{255}(n) \end{bmatrix} \quad (56)$$

$$w^{even}(n) = \begin{bmatrix} w_0(n) \\ w_2(n) \\ \vdots \\ w_{254}(n) \end{bmatrix} \quad (57)$$

$$w^{odd}(n) = \begin{bmatrix} w_1(n) \\ w_3(n) \\ \vdots \\ w_{255}(n) \end{bmatrix} \quad (58)$$

Where "i" shown in equations (53) through (58), equation (59) and equations (60) and (61) below, represents the scale adjustment made when $|w_j(n)| \geq w_{max}$ for any j and a particular time instant n, and "shift" is the programmable shift value in the ECF. The variable "i" may take on values of 0 or 1 and the constant "shift" may be decremented every time i=1, or at the occurrence of another condition.

The even and odd coefficient vectors shown above may form a polyphase filter that interpolates the input data by a factor of two, for example. Other factors may be implemented. The step value (n) may be time-varying to account for the periodic gear-shifting that takes place. The indices d1 (as shown by 1934 in FIG. 19) and d2 (as shown by 1912 at FIG. 19) may account for the delays shown in the block diagram of FIG. 19.

A DC offset estimate may also be used as an input to the hardware block. The DC term may be updated during the initial training while gear shifting is in effect. This computation is shown below.

$$dc = \frac{1}{1024} \sum_{i=0}^{1023} e(i) \qquad (59)$$

Gear shifting may be implemented to make the convergence of the algorithm occur more quickly. The excess mean squared error (EMSE) may be proportional to the step size. However, the number of samples that may be used to converge may be inversely proportional to the step size. Therefore, the desire may be to balance the convergence speed with the excess mean squared error.

Gear shifting may involve using different values of a scale factor $\mu$ at different points in the echo canceller training. When the initial training starts, a goal may be to traverse as much of the error performance surface as possible towards the goal of the minimum mean squared error. The following describes an example of a gear shifting procedure.

1. Start with a large step size that allows a fast convergence to same EMSE value.
2. After the desired EMSE is obtained, switch to a new smaller step size, which allows slower convergence to a new smaller EMSE.
3. Repeat step 2 until the final desired EMSE is achieved.

The optimum shift points may be determined by software. The following table lists the gear-shift point in samples and the right shift (e.g., power of two) division of the weights. These gears may be used in the initial training. While in steady state, a single gear may be used and may be approximately ½ the smallest $\mu$ in the table.

| | Gear# | | | | | |
|---|---|---|---|---|---|---|
| | 0 | 1 | 2 | 3 | 4 | 5 |
| Samples | 2000 | 598 | 1427 | 3188 | 7241 | 15000 |
| Right Shift | 3 | 4 | 5 | 6 | 7 | 8 |

The hardware portion of the echo canceller may perform a linear discrete time convolution as described by equations (60) and (61) below.

$$y(2n) = 2^{-(shift-1)}[x^T(n-d_2)w^{even}(n)] - dc \qquad (60)$$

$$y(2n+1) = 2^{-(shift-1)}[x^T(n-d_2)w^{odd}(n)] - dc \qquad (61)$$

The hardware may also compute the error signal, which may be used to adapt the software LMS update algorithm, as shown in equations (62) and (63).

$$e(2n) = d(2n) - 2^{-(shift-1)}x^T(n-d_2)w^{even}(n) \qquad (62)$$

$$e(2n+1) = d(2n+1) - 2^{-(shift-1)}x^T(n-d_2)w^{odd}(n) \qquad (63)$$

where d(n) is the T/2-spaced output of the RNRF filter and x(n) is the T-spaced output of the Tomlinson precoder, for example.

Figure 20:
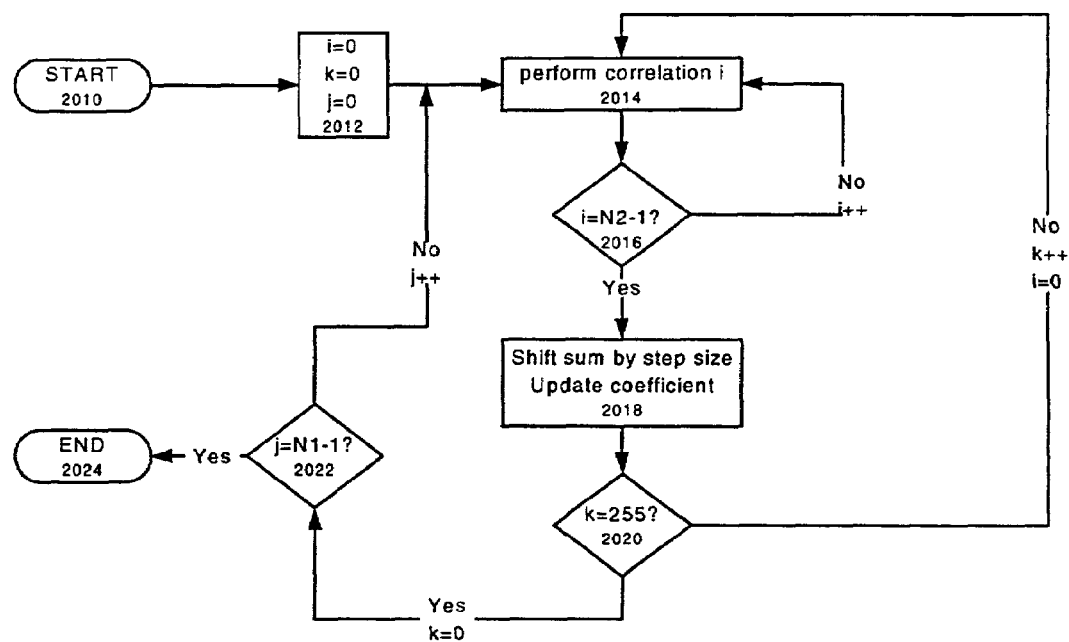
FIG. 20 is a flowchart illustrating a software algorithm, according to an embodiment of the third aspect of the present invention

FIG. 20 is a flowchart illustrating a software algorithm, according to an embodiment of the present invention where k is the coefficient index. The LMS algorithm may have various inputs, outputs, and storage factors. For example, storage factors may include an array of 256 64-bit locations to store the weight vector. The elements of this array may be initialized to zero. An input may include a step size parameter $\mu$ for determining the amount of right shift to perform on the averaged elements of the gradient vector. This may be changed by software at any time. Other inputs may include ECF delay; FIFO delay; number of symbols to process (e.g., N2*N1); number of gradient vectors to average, N2, before a weight vector is written to the ECF; Tomlinson precoder output, x(n), which may be a 16-bit number; and/or ECS (or AGC) output, e(n). Other inputs may be provided. An output of the LMS algorithm may include weight vector, w(n). The upper 16 bits of the high precision coefficient values may be written to the ECF portion of the hardware block.

As shown in FIG. 20, step 2010 indicates a start of the software algorithm. At step 2012, variables i, k, and j may be initialized to zero, where i is a block LMS index, k is a coefficient counter and j is a symbol counter. At step 2014, a correlation, as shown in the summation of equation (48) of variable i may be performed. At step 2016, a comparison or other process is performed to determine whether variable i is equal to N2−1, where N2 indicates the number of gradient vectors to average. If variable i is equal to N2−1, the sum is shifted by a step size and the coefficient k is updated at step 2018, as also shown in the update of the weight vector of equation (48). Otherwise, variable i may be adjusted by a predetermined value (as shown by i++) and the correlation of i is again performed at step 2014. At step 2020, a comparison or other process is performed to determine whether k is equal to a predetermined constant, such as 255, wherein k may include a coefficient index. If it is determined that k is equal to 255 at step 2020, k is initialized (e.g., k is made equal to zero). At step 2022, it may be determined whether j is equal to N1−1, where N1 is the total number of symbols used for the current training session. If so, step 2024 indicates the end of the software algorithm. Otherwise, variable j may be adjusted by a predetermined value (as shown by j++) and correlation i may be performed at step 2014. If k does not equal 255 at step 2020, k may be adjusted by a predetermined value (as shown by k++) and i may be initialized (e.g., i is made equal to zero) where correlation of i may be performed, at step 2014.

For example, a file blk_lmsupd_a.mip may contain the assembly code to perform the averaging of the gradient vector and the final coefficient update as well as overflow detection, in accordance with equation (48) above. The function may have the following inputs, blk_lmsupd2(pointer to 64-bit coefficients,
pointer to 16-bit input data,
pointer to even error sample,
number of coefficients,
step value,
number of samples per block)

The function may automatically update the coefficients and return an overflow flag. In addition, the hardware setup may involve the setting of control registers.

Another embodiment of the present invention may be directed to determining an efficient estimation of a base-2 logarithm of a number. According to an embodiment of the present invention, an estimation of the log base-2 of a fixed-point binary number in either hardware or software may be implemented using a minimal number of parameters. Specifically, a single $2^{nd}$ order or greater polynomial may be sufficient to cover an entire range of input values for any arbitrary input word precision. Applications may include calculating a signal to noise ratio (SNR), bit error rate (BER), power in dB and any other application involving the calculation of a logarithm to any base. This aspect of the present invention may apply to ADSL, DSL, G.SHDSL and other types of communication. Further, this embodiment of the present invention may be applied at a CO, a CPE, via wireless transmission and other types of applications.

The present invention may be implemented to estimate the base-2 logarithm of a number x, as shown in equation (64).

$$x = 2^k = 2^{(k_i + k_f)} = 2^{k_i} 2^{k_f} \quad (64)$$

As seen in (64), the logarithm (exponent) k is the sum of an integer part, $k_i$, and a fractional part (less than 1), $k_f$, as shown in equation (65).

$$k = k_i + k_f \quad (65)$$

A rough approximation of the base-2 logarithm may be found using equation (66), which performs an exact calculation of the integer part and a linear approximation to the fraction.

$$\log_2(x) \cong k_i + \hat{k}_f = k_i + \frac{x}{2^{k_i}} - 1 \text{ where} \quad (66)$$

$$\hat{k}_f = \frac{x}{2^{k_i}} - 1$$

According to an embodiment of the present invention, a linear approximation of the fraction $\hat{k}_f$ may be inserted into a polynomial function to estimate the fractional part of the log.

The fractional part of the log may have the same (or similar) functional shape for some or all numbers. As a result, a single polynomial may be used for an entire range (or other specified range) of input values, as shown in FIGS. 21 and 22.

Figures 21, 22:
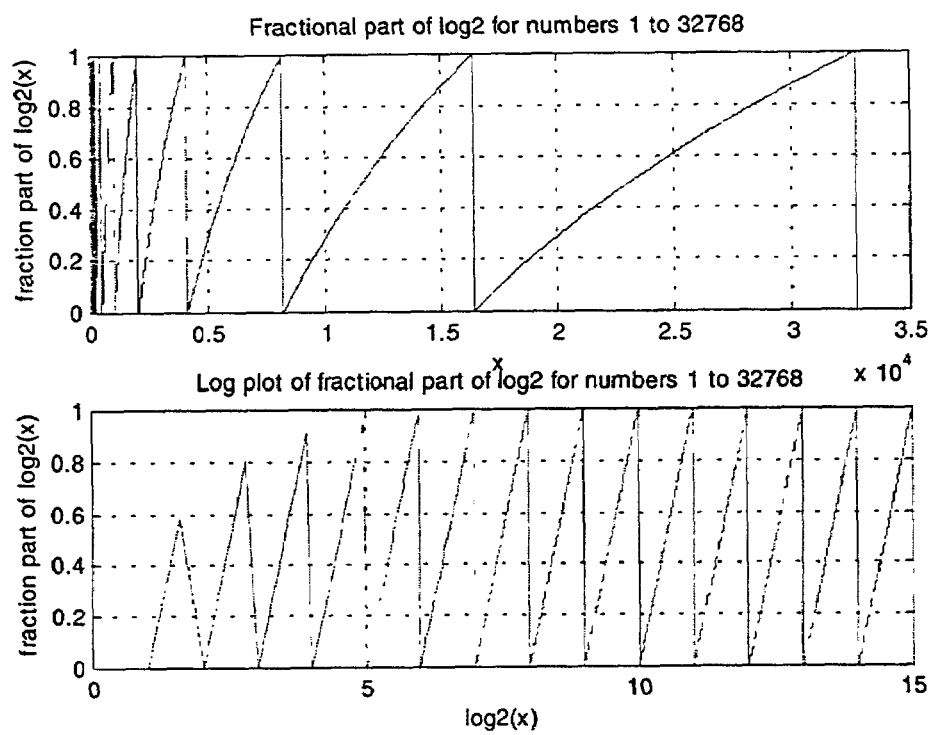
FIGS. 21 and 22 are charts illustrating a fractional part of a log, according to an embodiment of a fourth aspect of the present invention.

When observed on a linear scale as in FIG. 21, the fractional portion of the log appears to have a different shape throughout the range of numbers. When the same is plotted with a log2 scale in the x-dimension as in FIG. 22, the shape of the function representing the fraction part of the log is the same (or similar) for most or all numbers, indicating that a single polynomial may be found. For example, the function representing the fractional part of the log between $2^{12}$–$2^{13}$ is the function of the fractional part of the log between $2^{13}1$–$2^{14}$, only decimated, which means it is equal to every other sample of the sequence spanning $2^{13}$–$2^{14}$, for example. Likewise, the function of the fractional part is an up-sampled version of the function between $2^{11}$–$2^{12}$.

An example of a polynomial approximation to the fractional part is shown in equation (67).

$$k_f \cong \tilde{k}_f = \sum_{i=0}^{N-1} a_i (\hat{k}_f)^i \quad (67)$$

$a_i$ is the $i^{th}$ polynomial coefficient
N is the order of the polynomial

The polynomial may be determined using any curve fitting method for outputting coefficients. For example, the higher the order of the polynomial, the better the approximation to the fractional part of the log. Experiments have shown an accurate estimate with a $2^{nd}$ or $3^{rd}$ order polynomial. According to an embodiment of the present invention, the final log may be shown below in equation (68).

$$k \cong k_i + \tilde{k}_f = k_i + \sum_{i=0}^{N-1} a_i (\hat{k}_f)^i \quad (68)$$

The result of equation (68) is an approximate $\log_2$ of an integer number. If a numbering system assumes samples are fractional numbers between [−1,1), then the log may be found by, $$\log_2{}^{fract} = (k_i + \tilde{k}_f) - N_{Bits} + 1 \quad (69)$$

Logarithms to any base may be found by multiplying (68) by a constant using various log conversion methods.

The following plots (FIGS. 23–26) illustrate errors of different approximations in terms of dB, according to the present invention. The errors may be taken as the difference between the log base-2 using the matlab log2( ) function and the estimate of the log base-2, both converted to dB.

Figure 23:
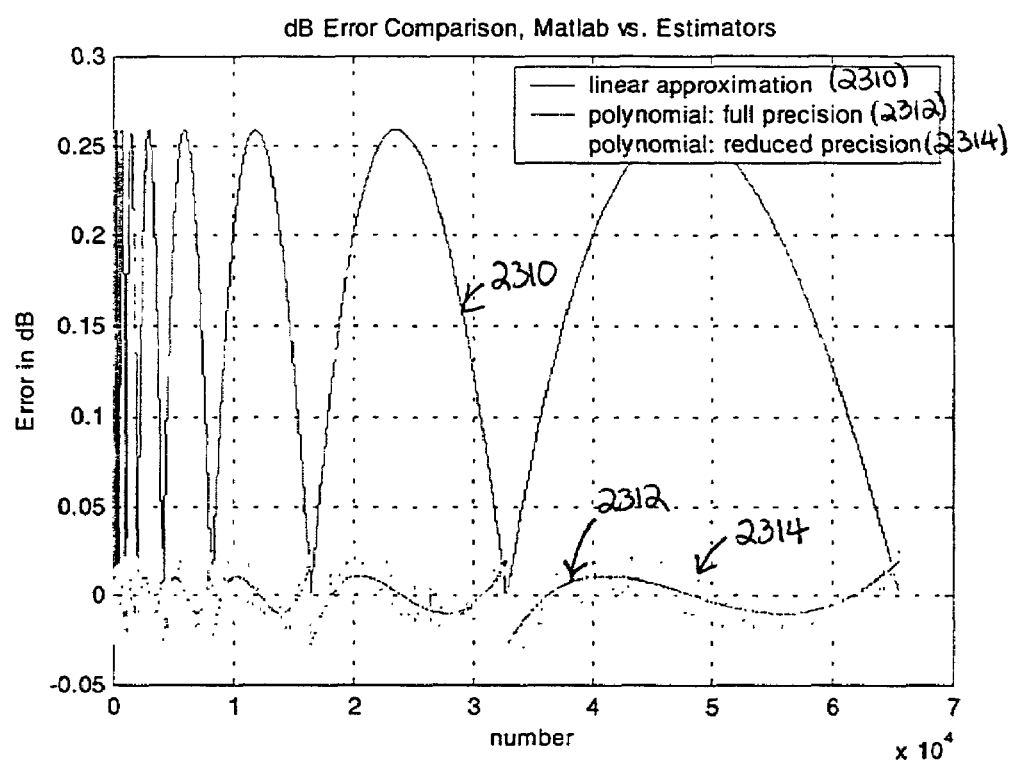
FIGS. 23–26 are charts illustrating errors of different approximations in terms of dB, according to an embodiment of the fourth aspect of the present invention.

FIG. 23 illustrates a comparison of the error in the linear approximation 2310, full matlab precision floating-point polynomial approximation 2312 and the reduced precision fixed-point polynomial approximation 2314. In this case, 8-bit polynomial coefficients and 8-bit polynomial inputs were used with a $2^{nd}$ order polynomial, producing a 16-bit result.

Figure 24:
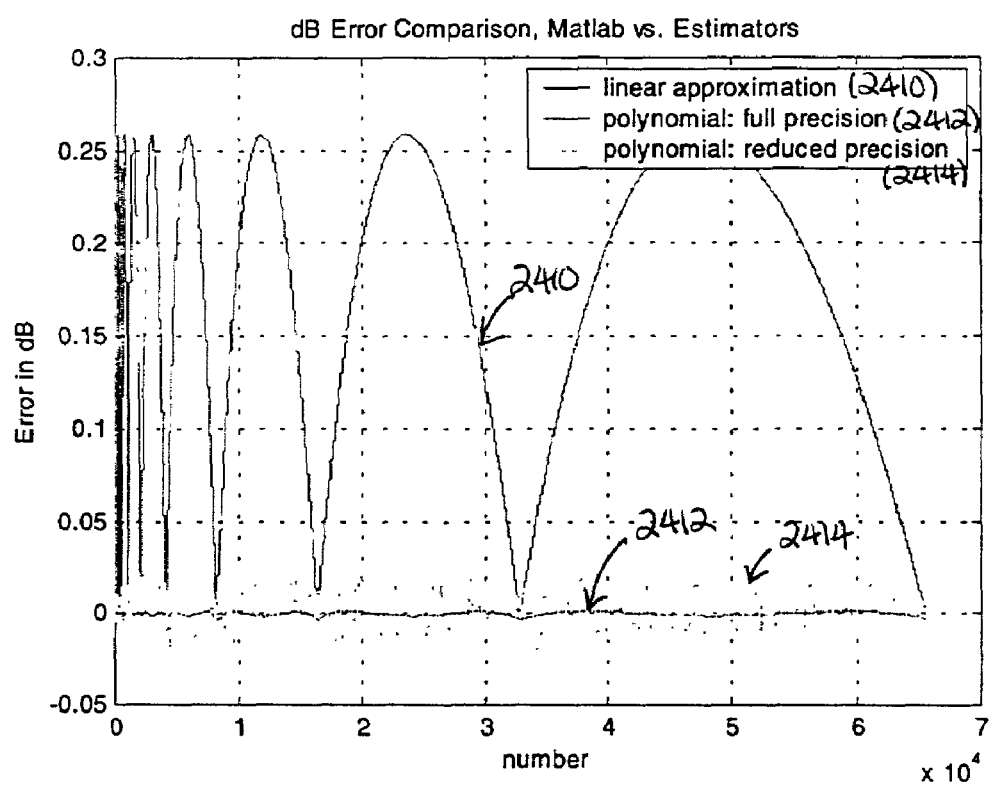

FIG. 24 illustrates a comparison of the error in the linear approximation 2410, full matlab precision floating-point polynomial approximation 2412 1 and the reduced precision fixed-point polynomial approximation 2414. In this case, 8-bit polynomial coefficients and 8-bit polynomial inputs were used with a $3^{rd}$ order polynomial, producing a 16-bit result.

Figure 25:
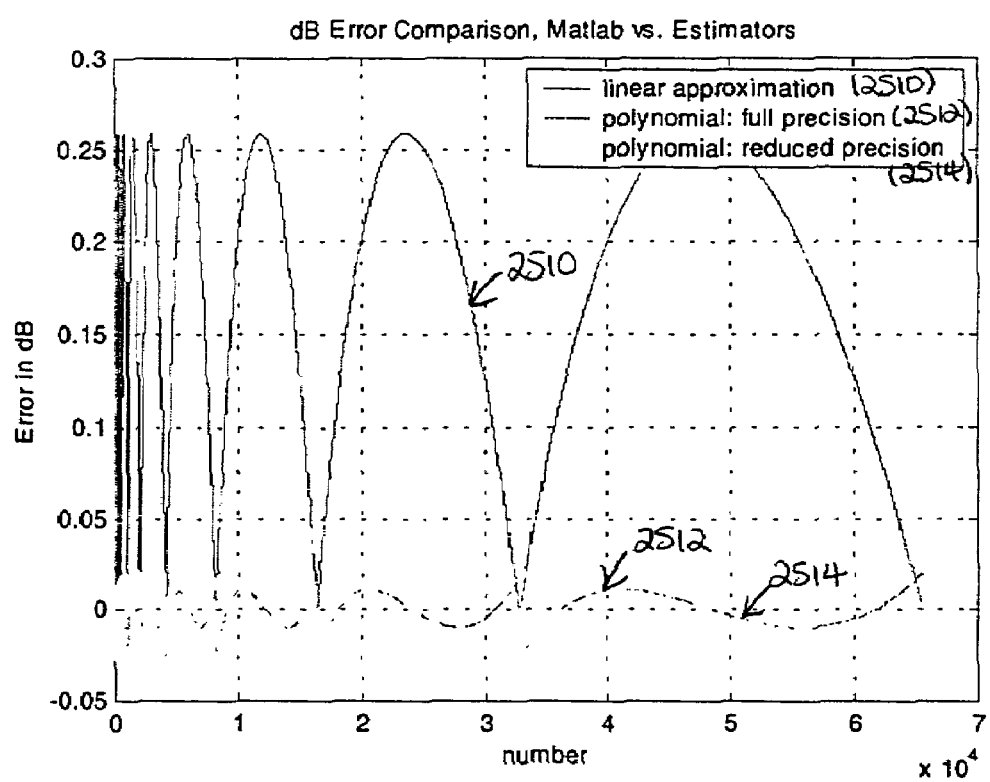

FIG. 25 illustrates a comparison of the error in the linear approximation 2510, full matlab precision floating-point polynomial approximation 2512 and the reduced precision fixed-point polynomial approximation 2514, where 2512 and 2514 essentially overlap. In this case, 16-bit polynomial coefficients and 16-bit polynomial inputs were used with a $2^{nd}$ order polynomial, producing a 32-bit result.

Figure 26:
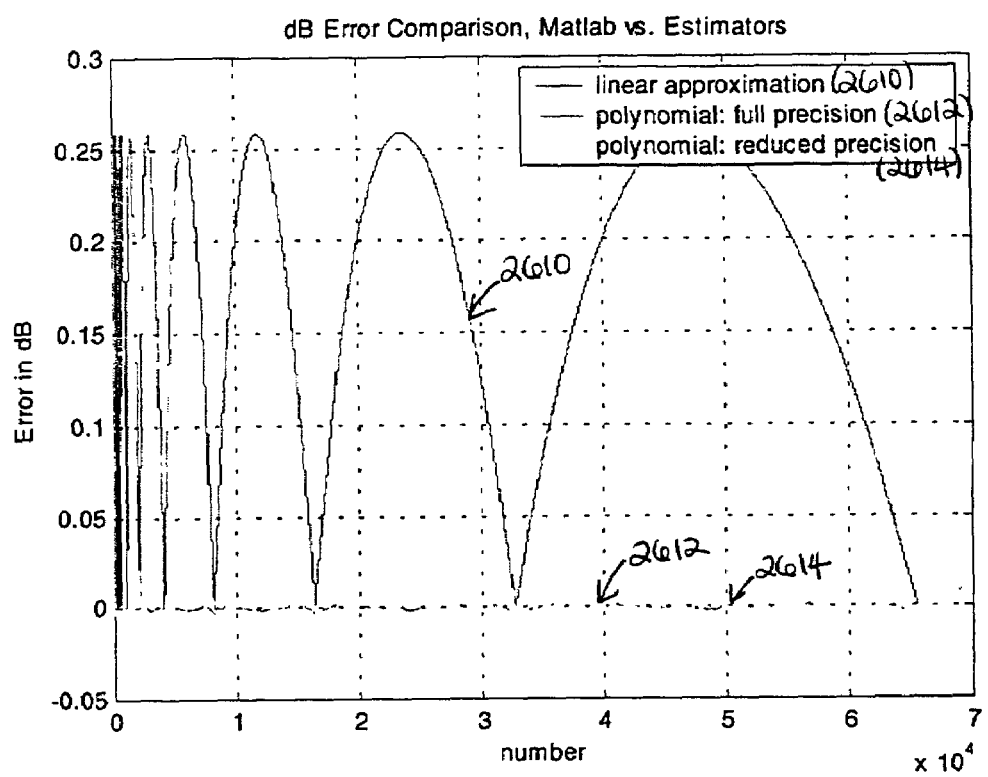

FIG. 26 illustrates a comparison of the error in the linear approximation 2610, full matlab precision floating-point polynomial approximation 2612 and the reduced precision fixed-point polynomial approximation 2614, where 2612 and 2614 essentially overlap. In this case, 16-bit polynomial coefficients and 16-bit polynomial inputs were used with a $3^{rd}$ order polynomial, producing a 32-bit result.

Figure 27:
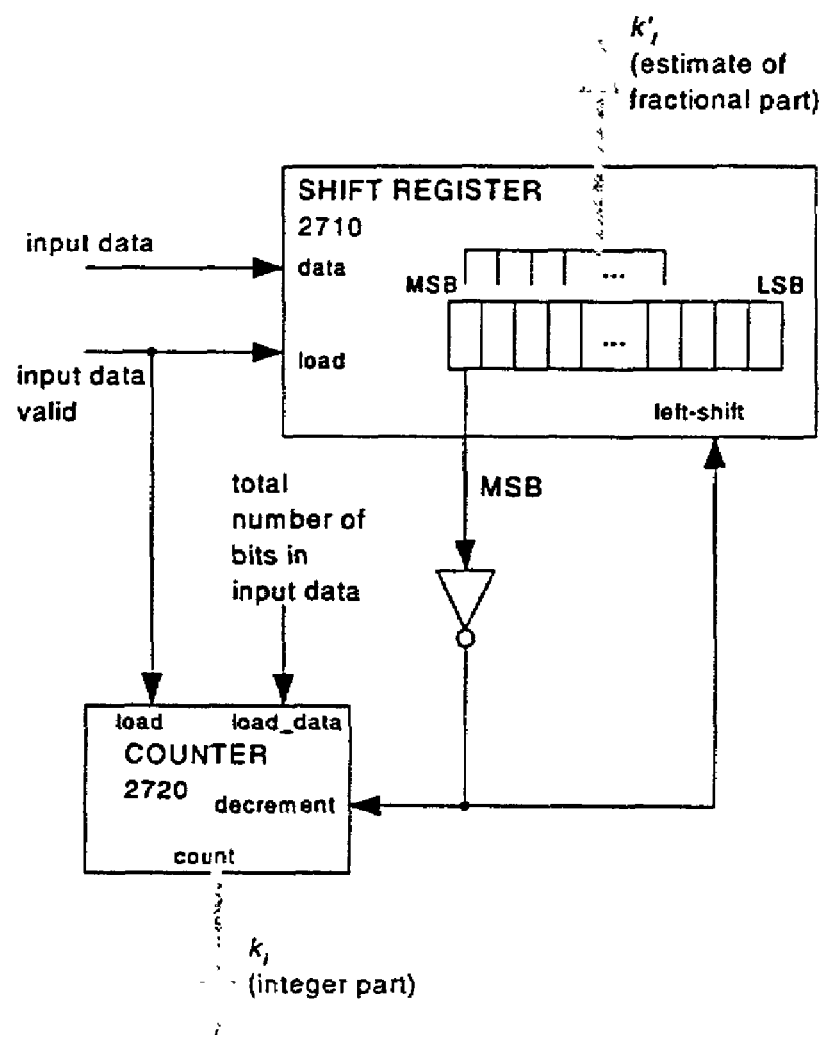
FIG. 27 is a block diagram of a digital circuit to generate an integer part and estimate of a fractional part of Log-2, according to an embodiment of the fourth aspect of the present invention.
Figure 28:
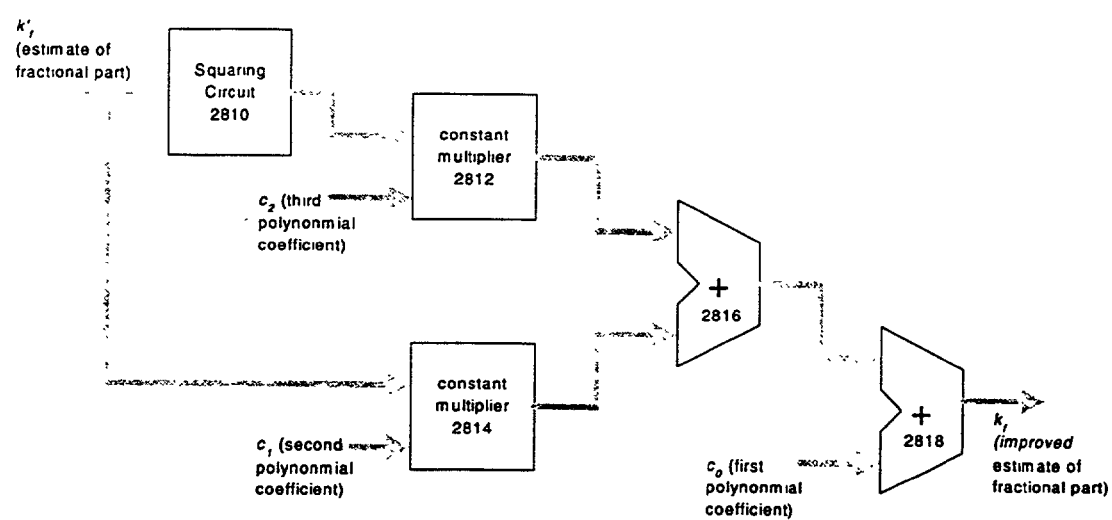
FIG. 28 is a block diagram of a digital circuit to implement a second order polynomial, according to an embodiment of the fourth aspect of the present invention.

FIGS. 27 and 28 illustrate hardware implementation details, according to an embodiment of the present invention. The digital circuit of the present invention may be composed of at least two portions. The first portion may be implemented to determine an integer part $k_i$ and an estimate of the fractional part $\tilde{k}_f$. The second portion may be used to implement the second order polynomial for a better estimate of the fractional part. Other higher order polynomials may also be implemented.

FIG. 27 illustrates a block diagram of a digital circuit for generating an integer part and an estimate of fractional part of log-2, according to an embodiment of the present invention. When a new valid input data becomes available, as may happen when the data is written to a data bus at periodic intervals determined by a clock, for example, it may be loaded into a shift register 2710. At the same (or near the same) time, a counter 2720 may be loaded with the total number of bits in the input data. If the most significant bit (MSB) of the shift register 2710 is zero, the data in the shift register 2710 may be left-shifted by one bit and the counter 2720 may be decremented by one. This process may repeat until the MSB of the shift register 2710 is one. Then, the counter output may contain the integer part $k_i$ and the MSB's of the shift register 2710 may become the estimate of the fractional part $\tilde{k}_f$. Other variations may be implemented.

FIG. 28 illustrates a block diagram of a digital circuit for implementing a second order polynomial, according to an embodiment of the present invention. The second order polynomial may be implemented with simple hardware components (e.g., squaring device 2810, constant multipliers 2812, 2814 and adders 2816, 2818). Constant multipliers 2812, 2814 may be built with one or more shifters and/or adders. In an example, the circuit may not require any real variable-operand multipliers. Thus, the algorithm may be efficiently implemented with simple hardware.

A squaring circuit 2810 (or other circuit corresponding to an order of the polynomial) may receive an estimate of a fractional part and generate a function of the estimate. A constant multiplier 2814 may receive the estimate of the fractional part and a second polynomial coefficient and generate a first output. A second constant multiplier 2812 may receive the function of the estimate of squaring circuit 2810 and a third polynomial coefficient and generate a second output. The first output of constant multiplier 2814 and the second output of second constant multiplier 2812 may be summed by adder 2816 for generating a first sum. A second adder 2818 may receive the first sum and a first polynomial coefficient for generating an improved estimate of the fractional part.

The following routine is an example of an un-optimized assembly language implementation used to achieve one aspect of the present invention. The target processor in this case is a 32-bit fixed point MIPS KC4. A $2^{nd}$ order polynomial is used in this example.

```
#define COEFF0_H 0x0126
#define COEFF1_H 0x548c
#define COEFF2_H 0xd4e0
#define MULTI_ADJUST 1
#define BITS_PER_WORD 0x20
.align 4
log2_32: /* usage: log2_32(a0 = input_word , a1 =
number_of_fractional_bits)
    clz   v0,a0                   /* counts leading zeros */
    move  t9,a1                   /* load resolution value to t9 */
    ori   t8,r0,
          (BITS_PER_WORD-1)
    sub   v1,t8,v0                /* finds integer exponent */
```

-continued

```
    ori   a1,r0,0x1               /* load a 1 into upper half word */
    sll   a1,a1,v1                /* shift to msb position */
    xor   a0,a0,a1                /* mask out MSB */
    sll   a0,a0,v0                /* left align remaining bits */
    lui   t0,COEFF0_H             /* load first coeff */
    lui   a3,COEFF1_H             /* load second coeff */
    mult  a3,a0                   /* peform first multiply */
    mfhi  a2                      /* result of first multiply */
    sll   a2,a2,
          (MULTI_ADJUST)          /* adjust for signed multiplication */
    move  t7,a2
    add   t0,a2                   /* add to previous result */
    lui   a3,COEFF2_H             /* load next coefficient */
    mult  a0,a0                   /* square sample */
    mfhi  a2                      /* load sample2 */
    sll   a2,a2,
          (MULTI_ADJUST)          /* adjust for signed multiplication */
    mult  a2,a3                   /* multiply by coefficient */
    mfhi  a2                      /* load result */
    sll   a2,a2,
          (MULTI_ADJUST)          /* adjust for signed multiplication */
    add   t0,a2                   /* accumulate to result */
    add   t0,t7
    slv   v1,v1,t9                /* left align */
    sub   t9,t8,t9                /* partial result */
    srl   t0,t0,t9                /* right align */
    or    v0,v1,t0                /* merge results */
    jr    ra
    nop
```

Virata Corporation's Aluminum™ DSL PHY is designed for full duplex symmetric transmission over ordinary single twisted copper pair when used, for instance, with the Aluminum Analog Front End (AFE). This chipset supports programmable data rates ranging from 192 Kbps to 4.6 Mbps on a single pair, and provides reach greater than 18,000 feet at 1.5 Mbps. Loop-lengths of up to 26,000 ft are supported at lower data rates.

The Aluminum™ chipset includes digital communications subsystems, which may include a combination of echo canceller, pre-coder, feed forward equalizer and decision feedback equalizer. Virata also offers its customers a comprehensive suite of technology solutions available to aid in the design, development and deployment of symmetric DSL products. This includes the BD3801 development reference platform for the Aluminum™ chipset. Aluminum™ and the Aluminum™ AFE are HDSL2/G.shdsl/2B1Q Synchronous Digital Subscriber Line (SDSL) compliant.

The Aluminum™ chipset provides customers with a data throughput increase of up to 100 percent over competitive G.shdsl solutions and enables the development of symmetric DSL products with lower power consumption, greater reach and higher performance than was previously possible. Aluminum™ and Aluminum™ AFE may be purchased as a bundle with Virata's Helium™ communications processor and comprehensive network protocol stack, creating a complete customer premises equipment solution for symmetric DSL gateways, routers, and integrated access devices (IAD). In support of this symmetric DSL chipset and software solution, Virata is also delivering a symmetric DSL to Ethernet router reference design.

Helium™ is a low-cost, Physical Layer Device (PHY)-neutral communications processor that enables high-speed Internet access capability for single- and multiple-user endpoint devices such as Universal Serial Bus (USB) modems, home gateway devices and small office/home office (SOHO) routers. The Helium™ chip may be fully integrated with a networking and protocol software suite that handles Asynchronous Transfer Mode (ATM), frame, routing, bridging and signaling functions, as well as Simple Network Management Protocol (SNMP) management.

Figure 29:
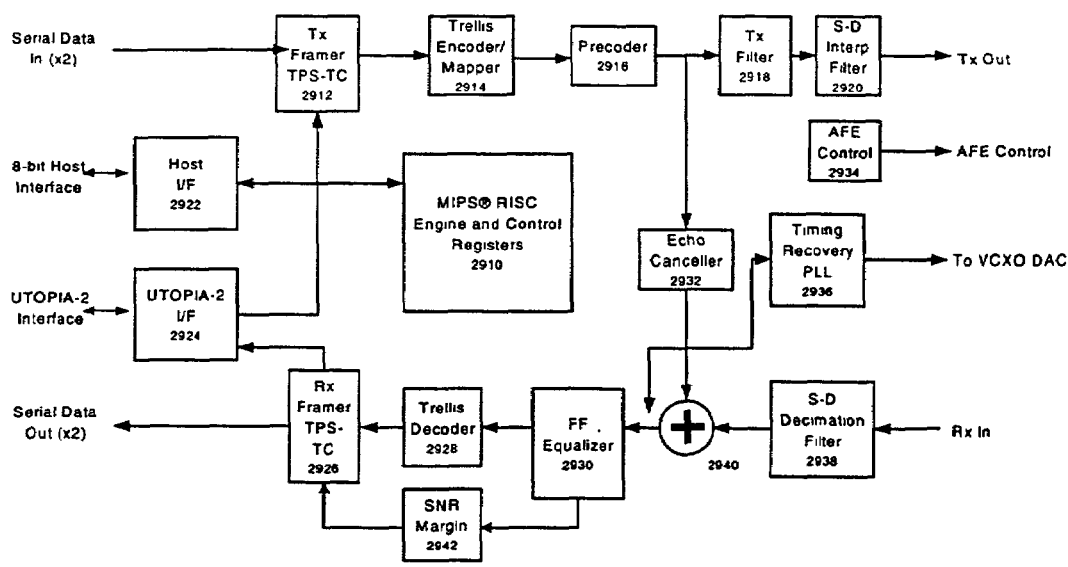
FIG. 29 is a schematic diagram of a hardware architecture in which the inventive aspects of the present invention may be incorporated.

FIG. 29 is a schematic diagram of a hardware architecture in which the inventive aspects of the present invention may be incorporated. The inventive concepts discussed above may be achieved with the processing aid of Million Instructions per Second (MIPS) 2910 shown in FIG. 29. The inventive concepts discussed above may be incorporated into chip sets, such as Virata Corporation's Aluminum™ 200 or 204 DSL Processor, which is also known as Virata's second generation symmetric high-speed DSL processor. Aluminum™ 200 or 204 may support several modes of operation including: International Telecommunications Union (ITU) G.991.2 (G.shdsl), American National Standard Institute (ANSI) T1E1.4 (High Speed Digital Subscriber Line (HDSL) 2) and single-pair 2B1Q SDSL. A solution for customer premises G.shdsl equipment, Aluminum™ 200 or 204 provides compliance with the ITU G.991.2 standard, as well as other standards. Data rates from 192 Kbps to 2.3 Mbps are supported on 8 Kbps boundaries. In addition, Aluminum™ 200 or 204 provides at least three additional base data rates above 2.3 Mbps: 3.096 Mbps, 4.104 Mbps and 4.616 Mbps.

The power spectral density (PSD) of the transmitted signal is programmable and supports defined symmetric and asymmetric PSDs. In addition, the adaptability of the PSD shaper may allow support of new PSDs that may be defined in the future.

The Aluminum™ 200 or 204 DSL Processor may support Transmission Protocol Specific—Transmission Convergence (TPS-TC) defined in G.991.2 including dual-bearer mode. By providing at least two independent serial channels, in addition to a UTOPIA Level 2 port, the Aluminum™ 200 or 204 may provide services such as simultaneous Synchronous Transfer Mode (STM) voice and ATM data transport.

Support for analog voice and G.shdsl on the same copper pair is provided through the Aluminum™ 200's or 204's G.shdsl-over-POTS mode. By using this capability, vendors and other entities may deliver the reach and symmetric performance of G.shdsl without giving up POTS service. G.shdsl-over-POTS further works with current ADSL splitters and microfilters, as well as other devices and components.

The Aluminum™ 200 or 204 DSL Processor may work in conjunction with Virata's Aluminum™ 200 Smart Analog Front End/Line Driver device, for example. The Aluminum™ 200 or 204 may control the Aluminum™ 200 AFE through a digital serial bus and may further provide for parameter calibration, power cutback and other functions. This configurability of the present invention allows the AFE to better match line conditions for higher performance and greater reach.

The BD3802 is a development platform for Aluminum™ 200 or 204 DSL Chipset, providing a comprehensive set of hardware and firmware tools to assist users in rapid development and deployment of products and services.

Product applications may include Symmetric DSL routers and Integrated Access Devices (IAD); DSL Access Multiplexers (DSLAMs); Multi-tenant and Multi-dwelling unit networks; T1/E1 distribution products; and T1/E1 pairgain systems (using 3 Mbps and higher data rates).

Specification details may include ITU G.991.2 (G.shdsl) compliant; T1E1.4 HDSL2 compliant; ETSL ETR-152 compliant (single pair); support for data rates, presently, from 192 Kbps to 4616 Kbps on 8 Kbps increments; programmable framer supports G.shdsl, HDSL2, European Telecommunications Standard Institute (ETSI) SDSL, HDSL and transparent framing; UTOPIA Level 2 interface for ATM data and two independent serial interfaces for STM data; and 8-bit multiplexed or non-multiplexed host bus to connect to a variety of host Central Processing Units (CPUs).

As shown in FIG. 29, MIPS Reduced Instruction Set Computing (RISC) engine and control registers 2910 may be coupled to a host interface 2922, which may in turn be coupled to a 8-bit host interface. A serial data input may be coupled to an input of Tx Framer TPS-TC 2912, which is further coupled to a Trellis Encoder/Mapper 2914. Trellis Encoder/Mapper 2914 may provide an input to Precoder 2916 where Precoder 2916 may be coupled to a Tx Filter 2918. Tx Filter 2918 may be coupled to (sigma-delta) S-D interpolating filter 2920 which is coupled to an output, Tx out. Utopia −2 Interface 2924 may be coupled to an input of Tx Framer TPS-TC 2912 and may further receive data from a Rx Framer TPS-TC 2926. S-D Decimation filter 2938 receives an input from Rx In and is coupled to an adder 2940. Adder 2930 sums outputs from filter 2938 and echo canceller 2932 and generates an output to Feed Forward (FF) equalizer 2930. FF equalizer 2930 may be coupled to a Timing Recovery Phase Locked Loop (PLL) 2936 at an input. At an output, Timing Recover PLL 2936 may be coupled to Volt Controlled Oscillator Digital Analog Converter (VCXO DAC), which in the case of the STUR is used to adjust the sampling phase to match that of the transmitting modem. FF equalizer 2930 may be coupled to a Trellis Decoder 2928, which may be in turn coupled to Rx Framer TPS-TC 2926. In addition, in the case of the Aluminum™ 204, a SNR margin 2942 may be coupled to FF equalizer 2930 and Rx Framer TPS-TC 2926, which may be further coupled to a Serial Data output.

Figure 30:
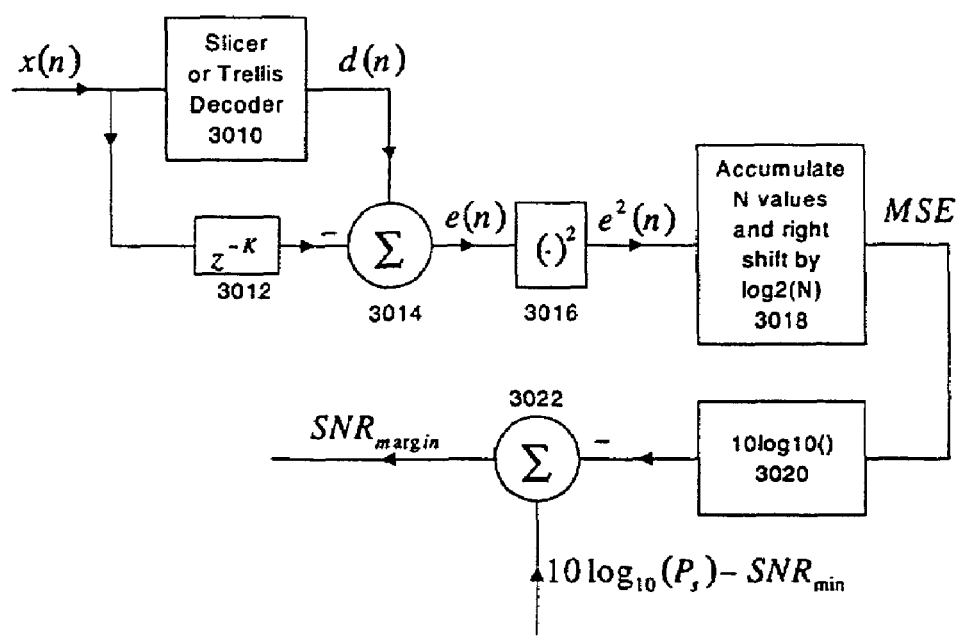
FIG. 30 is a block diagram illustrating details of SNR margin, according to an embodiment of the present invention.

In particular, Aluminum™ 204 may include SNR margin 2942, as discussed above and as shown in FIG. 29. Details of SNR margin 2942 are shown in FIG. 30. A purpose of a SNR-margin estimator may include determining SNR for a given constellation and input signal. The output of the estimator may include the SNR margin value in dB. The SNR-margin estimator may include a hardware module that performs the SNR computation. Software may select certain parameters based on the constellation type. FIG. 30 illustrates a block diagram showing the basic operation of a SNR-margin estimator.

A hardware module may perform a SNR-margin estimate that operates on a continuous stream of input samples and produces a SNR value. The margin may be found by comparing SNR to a minimum value. The software may perform a function of specifying the number of samples to average over as well as the signal power for a particular constellation.

The error signal may be computed by subtracting an input sample from a decoder or slicer output as shown in equation (70).

$$e(n)=d(n)-x(n-K) \qquad (70)$$

For example, slicer or decoder 3010 may receive an input signal x(n) to generate an output of d(n). In addition, input signal x(n) may be an input to function 3012 (e.g., $z^{-K}$) for generating an output to be subtracted from d(n) by adder 3014. The output of adder 3014 may include an error signal as defined in equation (70) above.

K may be defined as the delay through the decoder or slicer and d(n) may be a soft-decision output of Trellis decoder or an output of a slicer 3010. This error signal may be equal to the noise in the signal if the assumption is made that the decision, d(n), is correct. This leads to a meansquared-error (MSE) being approximately equal to the noise power as shown in equation (71).

$$E[e^2(n)] = MSE \cong \frac{1}{N}\sum_{n=0}^{N-1}(d(n)-x(n-K))^2 \cong P_n \quad (71)$$

$$SNR = 10\log_{10}\left(\frac{P_s}{P_n}\right) \cong 10\log_{10}\left(\frac{P_s}{MSE}\right) \quad (72)$$
$$= 10\log_{10}(P_s) - 10\log_{10}(MSE)$$

Function 3016 may receive error signal e(n) and generate a square of the error signal $e^2(n)$. Function 3018 may receive squared error signal and generate MSE. In particular, function 3018 may accumulate N values and right shift by log2(N).

The signal power for a given constellation is known, so the first term on the right of equation (72) above is a constant and the MSE dB value may be computed. For the log estimation, the following may be used. The desire is to estimate $\log_2(MSE)$, $$MSE = 2^k = 2^{(k_i+k_f)} = 2^{k_i}2^{k_f} \quad (73)$$

where the exponent k is the sum of an integer part, $k_i$, and a fractional part (less than 1), $k_f$, as shown below.

$$k = k_i + k_f \quad (74)$$

A rough approximation of $\log_2$ (MSE) may be found using the following equation, $$\log_2(MSE) \cong k_i + \hat{k}_f = k_i + \frac{x}{2^{k_i}} - 1 \quad (75)$$

Where $k_i$ is found by noting the position of the most significant bit (MSB). Function 3020 may receive MSE and generate $10\log_{10}(MSE)$. In particular, the estimate of the fraction, $k_f$, may then be improved by estimating the logarithms nonlinear fractional component using equation (76).

$$k_f \cong 0.0090 + 1.3211\hat{k}_f - 0.3369\hat{k}_f^2 \quad (76)$$

The result is the approximate $\log_2$ (MSE) of an integer number. To find $10\log_{10}$ (MSE), the scaling operation in equation (77) may be performed.

$$10\log 10(MSE) = 10\log_{10}(2)\log_2(MSE) \quad (77)$$

Finally, the SNR margin may be computed using equation (78).

$$SNR_{margin} = SNR - SNR_{min} \quad (78)$$

Adder 3022 may be used to calculate SNR margin by subtracting the result of function 3020 from $10\log_{10}(P_s) - SNR_{min}$. The following precisions may be assumed, such as Polynomial coefficients are 10-bits {0x002, 0x152, 0x3aa}; power samples are 16-bits; the rough estimate of the log fraction, $\hat{k}_f$ is minimum 8-bits; the resulting log is 16 bits, 6 integer and 10 fractional bits.

An example may include the following log estimation where $\log_2(00000000101010b)$ may be calculated.

The bit location of the first 1 is 7 so this means $k_i=7=111$. To estimate $\hat{k}_f$, the MSB is removed leaving 0101010b, which is the rough estimate of the fractional part of the log. The rough estimate of $\log_2$ is then 111.0101010, which is 7.328125. $k_f \cong (0.0090) + (1.3211)(0.328125) + (0.3369)(0.328125)^2$. Therefore, $k \cong 7.4062$ To find $10\log_{10}$ (0000000010101010b), $10\log_{10}(2)*k=22.2949$. The actual result calculated with a calculator is 22.304.

Several parameters may be implemented by software for the proper operation of the SNR-margin estimator. The number of samples to average over, N, may be input by software. This is input as $\log_2(N)$ and hardware will set the appropriate bit in a counter and then use the input value for the final shift. Another parameter may include the logarithm of the signal power. This value may be constellation specific and may be a parameter input by software even if the module works with one constellation. Yet another parameter may include the minimum SNR acceptable, $SNR_{min}$.

Figure 31:
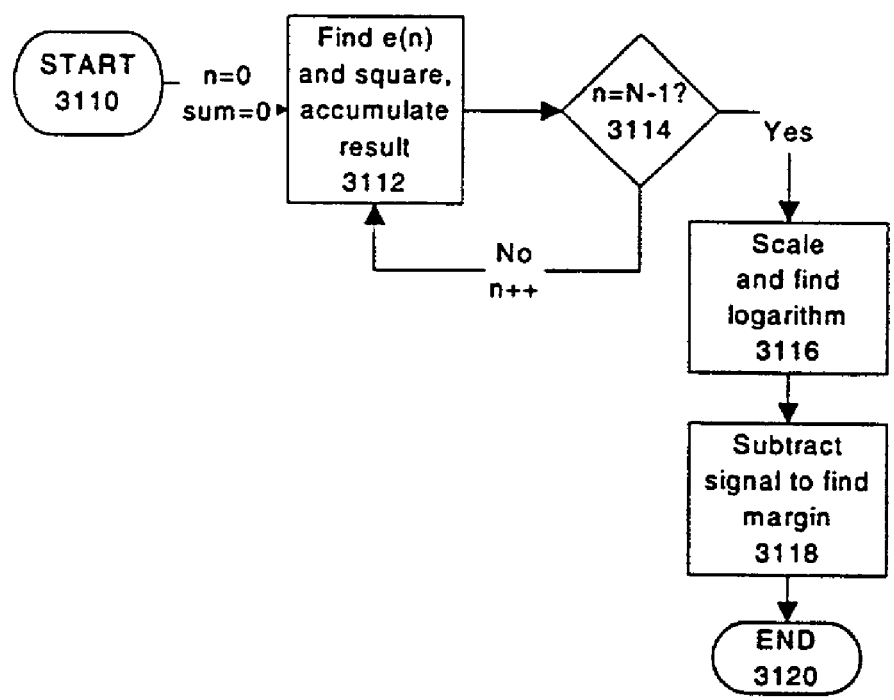
FIG. 31 illustrates a flowchart describing hardware algorithm for SNR margin, according to an embodiment of the present invention.

FIG. 31 illustrates a flowchart describing a hardware algorithm for SNR margin, according to an embodiment of the present invention. At step 3110, a start of a hardware algorithm for SNR margin may be initiated. Variables, such as n and sum may be initialized. At step 3112, an error signal, the square of the error signal and an accumulated result may be determined. At step 3114, it may be determined whether n=N−1 wherein N may be a summation length. If not, variable n may be adjusted by a predetermined value (as shown by n++) where step 3112 may be invoked. Otherwise, a logarithm may be determined and further scaled, at step 3116. At step 3118, the margin may be determined by subtracting a signal. Step 3120 indicates the end of the algorithm.

An input to the hardware algorithm may include summation length, N. This number may be a power of 2 and may range from approximately 64 to approximately 32768. Summation length may be input as $\log_2(N)$. Other inputs may include constellation type, $10\log_{10}(P_s)$ and $SNR_{min}$, which represents a minimum SNR to obtain a specific BER, for example. Storage factors may include $\log_2(N_{max})+22=15+22=37$ bit accumulator to store the power sum. This accumulator may be cleared to zero every time a new average is started. Other storage factors may include K+1, where K represents the delay from a Trellis decoder input to output, samples of the input signal, 12-bits each, for example. The output may include SNR margin, which may include five integer bits. This means that a maximum value this output may have is approximately 31 dB. This may be compared to a threshold of 0–15 dB to determine if the margin is too small. The 16-bit SNR value may be subtracted from the reference, which may also be 16 bits. The value may then be rounded and the lower 5 integer bits compared to the threshold.

Figure 32:
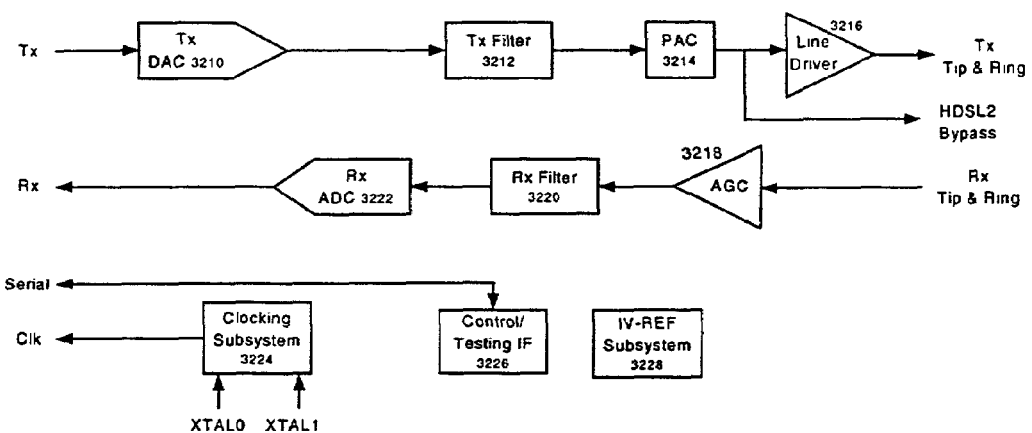
FIG. 32 is a schematic diagram of a hardware architecture in which the inventive aspects of the present invention may be incorporated.

FIG. 32 is a schematic diagram of a hardware architecture which may function with devices supporting certain inventive aspects of the present invention. AFE, such as the Aluminum™ 200 AFE, is a G.SHDSL/HDSL2/2B1Q SDS1 compliant Analog Front End (AFE) with integrated line driver designed to be used with Virata's Aluminum™ 200 or 204 Symmetric DSL Processor to an external 2/4 wire hybrid.

The Aluminum™ 200 AFE conforms to G.shdsl PSD masks for every rate when interfaced to the Aluminum™ 200 or 204 DSL Processor, Aluminum™ 200 AFE also conforms to the HDSL2 OPTIS PSD mask at 1.544 Mbps. Aluminum™ 200 AFE may be used in a central office or remote application mode, selectable by configuring the programmable filters in the Aluminum™ 200 or 204 DSL Processor.

The Aluminum™ 200 AFE may include a high resolution 16-bit TX Digital Analog Converter (DAC) in the transmit path and one high resolution 16-bit RX Analog Digital Converter (ADC) in the receive path. A 10-bit DAC for the VCXO control is also integrated in the Aluminum™ 200

AFE to reduce the number of required external components. The transmitter programmable attenuation control (PAC) and the receiver programmable gain amplifier (PGA) may be programmed via the Aluminum™ 200 or 204 processor through a two-wire serial bus.

Aluminum™ 200 AFE has a low total power consumption of less than 800 mWatt (including the line drive) in full operation mode. An external line driver may also be used for HDSL2 and asymmetric PSD applications. Aluminum™ 200 AFE may also provide a power down mode for stand-by operation.

Product applications may include symmetric DSL routers and integrated access devices; DSL access multiplexers (DSLAMs); multi-tenant and multi-dwelling unit networks; T1/E1 distribution products; and T1/E1 pairgain systems (using proprietary 3 Mbps and higher data rates). Specification details may include ITU G.991.2 (G.shdsl) compliant; T1E1.4 HDSL2 compliant; ETSI ETR-152 compliant (single pair); and support for data rates from 192 Kbps to 2.312 Mbps and 8Kbps increments, plus three additional rates of 3.096 Mbps, 4.104 Mbps and 4.616 Mbps.

As shown in FIG. 32, a transmission line may include a Tx Digital Audio Video (DAV) 3210 coupled to a Tx Filter 3212, further coupled to a Programmable Attenuation Control (PAC) 3214. PAC 3214 is coupled to a Line Driver 3216, which is coupled to a Tx Tip & Ring. PAC 3214 may be further coupled to a HDSL2 bypass. A receiving line includes Automatic Gain Control (AGC) 3218 coupled to Rx Tip & Ring at an input and Rx Filter 3220 at an output. Rx Filter 3220 is coupled to Rx ADC 3222. A control/testing interface 3226 may be provided on a serial line. A clocking subsystem 3224 may receive a plurality of inputs. The hardware architecture of FIG. 32 may further include a Current and Voltage Reference Generator (IV-REF) Subsystem 3228.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for adapting a filter length of an echo canceller filter based on data rate, the method comprising the steps of:
    measuring a plurality of approximate filter lengths at a plurality of data rates;
    fitting a polynomial to a curve representing the approximate filter lengths at the plurality of data rates;
    inputting a selected data rate to a function of the polynomial for generating an approximate number of filter taps for modeling an echo channel for the selected data rate; and
    adjusting the number of filter taps based on the selected data rate;
    wherein a mean square error associated with the echo canceller filter is reduced.

2. The method of claim 1, wherein a number of CPU cycles per filter coefficient update is reduced.

3. The method of claim 1, wherein a number of echo canceller coefficient updates is increased by a reduction in CPU cycles.

4. The method of claim 1, wherein the step of adjusting is a static adjustment.

5. The method of claim 1, wherein the step of adjusting is prior to an echo canceller training session.

6. The method of claim 1, wherein the curve is a linear curve.

7. The method of claim 1, wherein training time of the echo canceller filter at lower rates is extended.

8. The method of claim 1, wherein the filter length comprises a number of filter taps for modeling an echo channel.

9. The method of claim 1, further comprising the step of:
    determining an echo tail wherein the echo tail comprises a point where at least one filter coefficient decays to a value below a predetermined value towards an end of a filter.

10. The method of claim 9, further comprising the step of:
    varying the number of filter taps for compensating for the echo tail.

11. The method of claim 9, wherein the value is approximately equal to one least significant bit.

12. The method of claim 9, wherein the at least one filter coefficient approaches a noise floor.

13. The method of claim 1, further comprising the step of:
    detecting an analog delay, wherein the analog delay is a delay in time of an echo.

14. The method of claim 13, further comprising the step of:
    determining a section of filter taps towards a beginning of a filter, the section of filter taps approaching a quantization noise floor.

15. The method of claim 13, further comprising the step of:
    varying the number of filter taps for compensating for the analog delay.

16. The method of claim 1, wherein the modem operates according to the G.SHDSL standard.

17. In a communication network having a first modem in communication with a second modem over a communication channel, a system for adapting a filter length of an echo canceller filter based on data rate, the system comprising:
    a measuring module for measuring a plurality of approximate filter lengths at a plurality of data rates;
    a fitting module for fitting a polynomial to a curve representing the approximate filter lengths at the plurality of data rates;
    an input module for inputting a selected data rate to a function of the polynomial for generating an approximate number of filter taps for modeling an echo channel for the selected data rate; and
    an adjusting module for adjusting the number of filter taps based on the selected data rate;
    wherein a mean square error associated with the echo canceller filter is reduced.

18. The system of claim 17, wherein a number of CPU cycles per filter coefficient update is reduced.

19. The system of claim 17, wherein a number of echo canceller coefficient updates is increased by a reduction in CPU cycles.

20. The system of claim 17, wherein the adjusting module performs static adjustment.

21. The system of claim 17, wherein the adjusting module performs an adjustment prior to an echo canceller training session.

22. The system of claim 17, wherein the curve is a linear curve.

23. The system of claim 17, wherein training time of the echo canceller filter at lower rates is extended.

24. The system of claim 17, wherein the filter length comprises a number of filter taps for modeling an echo channel.

25. The system of claim 17, further:
an echo tail determining module for determining an echo tail wherein the echo tail comprises a point where at least one filter coefficient decays to a value below a predetermined value towards an end of a filter.

26. The system of claim 25, further comprising:
a varying module for varying the number of filter taps for compensating for the echo tail.

27. The system of claim 25, wherein the value is approximately equal to one least significant bit.

28. The system of claim 25, wherein the at least one filter coefficient approaches a noise floor.

29. The system of claim 17, further comprising:
a detecting module for detecting an analog delay, wherein the analog delay is a delay in time of an echo.

30. The system of claim 29, further comprising:
a filter tap determining module for determining a section of filter taps towards a beginning of a filter, the section of filter taps approaching a quantization noise floor.

31. The system of claim 29, further comprising:
a varying module for varying the number of filter taps for compensating for the analog delay.

32. The system of claim 17, wherein the modem operates according to the G.SHDSL standard.

33. A method for adapting a filter length of an echo canceller filter based on data rate, the method comprising the steps of:
initiating a line probe session;
performing an abbreviated echo canceller training during the line probe session for determining a length of an echo tail;
estimating a number of taps for the echo canceller filter based on the abbreviated echo canceller training; and
adjusting the number of taps;
wherein a mean square error associated with the echo canceller filter is reduced.

34. The method of claim 33, wherein the step of adjusting the number of taps further comprises the step of:
calculating a mean filter wherein $$y_k = \frac{1}{10}\sum_{i=o}^{9} w_{k-i} \; k = 0, 1 \cdots M-1$$

where M represents a maximum length in taps of the echo canceller filter and w represents filter coefficients,
determining whether $y_k$ drops below a predetermined threshold, and
truncating the echo canceller filter by discarding one or more remaining taps below the predetermined threshold.

35. The method of claim 34, wherein the predetermined threshold is determined by $$20\log_{10}\left(\frac{T}{2^{15}}\right) = -80 \text{ where } T = 2^{15}10^{\frac{-80}{20}} = 3.2768.$$

36. In a communication network having a first modem in communication with a second modem over a communication channel, a system for adapting a filter length of an echo canceller filter based on data rate, the system comprising:
a line probe module for initiating a line probe session;
a training module for performing an abbreviated echo canceller training during the line probe session for determining a length of an echo tail;
an estimating module for estimating a number of taps for the echo canceller filter based on the abbreviated echo canceller training; and
an adjusting module for adjusting the number of taps;
wherein a mean square error associated with the echo canceller filter is reduced.

37. The system of claim 36, wherein the adjusting module further comprises:
a calculating module for calculating a mean filter wherein $$y_k = \frac{1}{10}\sum_{i=o}^{9} w_{k-i} \; k = 0, 1 \cdots M-1$$

where M represents a maximum length in taps of the echo canceller filter and w represents filter coefficients,
a determining module for determining whether yk drops below a predetermined threshold, and
a truncating module for truncating the echo canceller filter by discarding one or more remaining taps below the predetermined threshold.

38. The system of claim 36, wherein the predetermined threshold is determined by $$20\log_{10}\left(\frac{T}{2^{15}}\right) = -80 \text{ where } T = 2^{15}10^{\frac{-80}{20}} = 3.2768.$$

* * * * *